United States Patent
Chen et al.

(10) Patent No.: US 10,893,508 B2
(45) Date of Patent: Jan. 12, 2021

(54) COMMUNICATION METHOD, TERMINAL, ACCESS NETWORK DEVICE, AND CORE NETWORK DEVICE

(71) Applicant: HUAWEI TECHNOLOGIES CO., LTD., Guangdong (CN)

(72) Inventors: Yuhua Chen, Shanghai (CN); Qiyang Zhao, Shenzhen (CN); Rui Ni, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/401,999

(22) Filed: May 2, 2019

(65) Prior Publication Data
US 2019/0261187 A1    Aug. 22, 2019

Related U.S. Application Data

(63) Continuation of application No. PCT/CN2017/106558, filed on Oct. 17, 2017.

(30) Foreign Application Priority Data

Nov. 4, 2016 (CN) .......................... 2016 1 0979212

(51) Int. Cl.
*H04W 16/10* (2009.01)
*H04W 24/10* (2009.01)
(Continued)

(52) U.S. Cl.
CPC .......... *H04W 72/04* (2013.01); *H04W 16/10* (2013.01); *H04W 24/10* (2013.01);
(Continued)

(58) Field of Classification Search
CPC ...... H04L 5/0001–26; H04W 4/50–70; H04W 8/18–245; H04W 16/02–16;
(Continued)

(56) References Cited

U.S. PATENT DOCUMENTS

| | | | |
|---|---|---|---|
| 2017/0070892 A1* | 3/2017 | Song | H04W 48/20 |
| 2017/0208019 A1 | 7/2017 | Shimojou et al. | |
| 2017/0332421 A1* | 11/2017 | Sternberg | H04W 72/048 |

FOREIGN PATENT DOCUMENTS

| | | |
|---|---|---|
| CN | 106060900 A | 10/2016 |
| JP | 2016184853 A | 10/2016 |
| WO | 2016152587 A1 | 9/2016 |

OTHER PUBLICATIONS

Extended European Search Report issued in European Application No. 17868076.5 dated Jul. 24, 2019 11 pages.
(Continued)

*Primary Examiner* — Timothy J Weidner
(74) *Attorney, Agent, or Firm* — Fish & Richardson P.C.

(57) ABSTRACT

The present disclosure describes example communication methods, terminals, access network devices, and core network devices. One example communication method includes sending, by an access network device, a slice resource adjustment message to a terminal, where the slice resource adjustment message includes target resource information, and wherein the slice resource adjustment message is used to instruct the terminal to adjust a resource of a slice currently accessed by the terminal to the target resource. The access network device receives a slice resource adjustment complete message sent by the terminal, where the slice resource adjustment complete message is used to indicate that the terminal has adjusted the resource of the slice currently accessed by the terminal to the target resource.

20 Claims, 11 Drawing Sheets

(51) Int. Cl.

| | |
|---|---|
| *H04W 28/02* | (2009.01) |
| *H04W 36/00* | (2009.01) |
| *H04W 48/08* | (2009.01) |
| *H04W 72/04* | (2009.01) |
| *H04W 72/12* | (2009.01) |
| *H04W 76/20* | (2018.01) |
| *H04W 84/04* | (2009.01) |
| *H04W 88/02* | (2009.01) |
| *H04W 88/08* | (2009.01) |
| *H04W 88/12* | (2009.01) |
| *H04W 92/10* | (2009.01) |

(52) U.S. Cl.
CPC .... *H04W 28/0247* (2013.01); *H04W 36/0072* (2013.01); *H04W 48/08* (2013.01); *H04W 72/042* (2013.01); *H04W 72/0406* (2013.01); *H04W 72/0413* (2013.01); *H04W 72/0453* (2013.01); *H04W 72/1252* (2013.01); *H04W 72/1257* (2013.01); *H04W 76/20* (2018.02); *H04W 84/042* (2013.01); *H04W 88/02* (2013.01); *H04W 88/08* (2013.01); *H04W 88/12* (2013.01); *H04W 92/10* (2013.01)

(58) Field of Classification Search
CPC ..... H04W 24/02–10; H04W 28/02–26; H04W 36/00–385; H04W 48/02–20; H04W 60/005–06; H04W 72/005–14; H04W 76/10–50; H04W 84/02; H04W 84/04; H04W 84/042–047; H04W 88/005–18; H04W 92/02–14
See application file for complete search history.

(56) References Cited

OTHER PUBLICATIONS

S2-163510—LG Electronics, "Solution for Key issue 3 UE requested resource usage preference," SA WG2 Meeting S2#116 Jul. 11-15, 2016, Vienna, Austria, XP051121204, 4 pages.
Office Action issued in Chinese Application No. 201610979212.8 dated Dec. 27, 2019, 16 pages (with English translation).
3GPP TR 23.799 V1.0.0 (Sep. 2016), 3rd Generation Partnership Project;Technical Specification Group Services and System Aspects; Study on Architecture for Next Generation System (Release 14), 423 pages.
PCT International Search Report and Written Opinion in International Application No. PCT/CN2017/106558, dated Jan. 16, 2018, 15 pages (With English translation).
NextGen, "High-level Functional Architecture for the Network Slicing" Temporary document provided to attendees at SA WG2 Meeting #114, Sophia Antipolis, FR , Apr. 11-15, 2016, 4 pages.
Nokia, "Adding/removing slices," SA WG2 Meeting #116, S2-164665, Sanya, P.R. China, Aug. 29-Sep. 2, 2016, 4 pages.
Office Action issued in Chinese Application No. 201610979212.8 on Aug. 4, 2020, 25 pages (with English translation).

* cited by examiner

COMMUNICATION METHOD, TERMINAL, ACCESS NETWORK DEVICE, AND CORE NETWORK DEVICE

CROSS-REFERENCE TO RELATED APPLICATIONS

This application is a continuation of International Application No. PCT/CN2017/106558 filed on Oct. 17, 2017, which claims priority to Chinese Patent Application No. 201610979212.8, filed on Nov. 4, 2016. The disclosures of the aforementioned applications are hereby incorporated by reference in their entireties.

TECHNICAL FIELD

The present invention relates to the field of communications technologies, and specifically, to a communication method, a terminal, an access network device, and a core network device.

BACKGROUND

A wireless communications system provides communication services for services in fields such as education, medical care, enterprises, government, the Internet of Vehicles, and the Internet of Things. A conventional communications system uses a unified pipeline architecture to provide different services, which cannot effectively meet differentiated performance requirements of different services. At present, looking into 2020 and the future, a mobile communications technology will enter fifth generation mobile communications (5G). A future 5G network is intended to use a slice architecture to meet the differentiated performance requirements of different services.

The 5G will meet people's requirements for ultra-high traffic density, ultra-high connection density, ultra-high mobility, and ultra-low end-to-end latency, and can provide users with extreme service experiences such as high-definition videos, virtual reality, enhanced reality, Cloud Desktop, and online gaming. The 5G will penetrate into the Internet of Things and other fields, and integrate deeply with industrial facilities, medical instruments, and transportation vehicles, so as to realize the "Internet of Everything" in an all-around way and effectively meet information service needs of vertical industries such as industry, medical treatment, and transportation. The 5G will also significantly improve energy consumption and costs efficiency of network construction and operation, comprehensively improve a service innovation capability, and shorten a time period for launching a new service.

Different from a previous mobile communications system in which multi-access technology innovation is used as a transition flag, a concept of 5G is extended from wireless to a network side. The 5G network includes a new infrastructure platform and a new logical architecture. A current telecom technology infrastructure platform is implemented based on dedicated hardware. The 5G network implements the new infrastructure platform based on general-purpose hardware by introducing a Network Functions Virtualization (NFV) technology, a software-defined networking (SDN) technology, and a Cloud (Cloud) technology. The 5G network promotes functional evolution of an access network (RAN) and a core network (CN), and constructs a new logical architecture that is user-centered, on-demand orchestrated, and on-demand customized by introducing new network protocols and new network element entities.

To meet service requirements of different scenarios, the 5G network uses a slice method, that is, a network includes a plurality of slices, and a specific slice is defined as a set of logical network functional entities that support communication service requirements of a specific scenario, for example, a slice that supports communication between a large quantity of machines or devices, a slice that supports a mobile broadband service, a slice that supports a high-reliability mobile communication service, and the like.

In the 5G network, slice management is an important component of network control and is independent of a control plane, and handover is an important process of the 5G network. For example, a terminal is handed over from one slice to another slice, or spectrum bandwidth corresponding to a slice used by the terminal changes, or a slice resource adjustment is caused by handover of the terminal from one access network device to another access network device. No related technology is available for enabling a network in which slices are deployed, to support handover of the terminal.

SUMMARY

The present invention provides a communication method, a terminal, an access network device, and a core network device, so as to facilitate adjustment of a slice resource in a communications network.

According to a first aspect, an embodiment of the present invention provides a communication method, including: first sending, by an access network device, a slice resource adjustment message to a terminal, where the slice resource adjustment message includes target resource information, and the slice resource adjustment message is used to instruct the terminal to adjust a resource of a slice currently accessed by the terminal to the target resource; and then receiving, by the access network device, a slice resource adjustment complete message sent by the terminal, where the slice resource adjustment complete message is used to indicate that the terminal has adjusted the resource of the slice currently accessed by the terminal to the target resource.

According to a second aspect, an embodiment of the present invention provides a communication method, including: first sending, by a core network device, a slice resource adjustment indication message to an access network device, where the slice resource adjustment indication message includes a terminal identifier and target resource information, and the slice resource adjustment indication message is used to instruct the access network device to adjust a resource of a slice currently accessed by the terminal to the target resource; and then receiving, by the core network device, a terminal slice resource adjustment complete message sent by the access network device, where the terminal slice resource adjustment complete message is used to indicate that the terminal has adjusted the resource of the slice currently accessed by the terminal to the target resource.

According to a third aspect, an embodiment of the present invention provides a communication method, including: first receiving, by a terminal, a slice resource adjustment message from an access network device, and obtaining target resource information from the slice resource adjustment message; and then adjusting, by the terminal, a resource of a slice currently accessed by the terminal to the target resource; and sending, by the terminal, a slice resource adjustment complete message to the access network device, where the slice resource adjustment complete message is used to indicate that the terminal has adjusted the resource of the slice currently accessed by the terminal to the target resource.

In this embodiment of the present invention, the slice resource adjustment message is sent to instruct the terminal to adjust the resource of the slice, and the target resource information is carried in the slice resource adjustment message, so as to implement management of the slice resource of the terminal.

In an example, before the sending, by the access network device, the slice resource adjustment message to the terminal, the method includes: receiving, by the access network device, an indication message that is from a core network device and that is used to instruct the terminal to adjust the slice resource.

In an example, the target resource includes a target spectrum resource.

In an example, the target spectrum resource includes a target center frequency and/or target spectrum bandwidth.

In an example, the slice resource adjustment indication message further includes a target slice identifier.

In an example, before the terminal configures the resource of the slice currently accessed by the terminal, the terminal determines whether a software resource and/or a hardware resource of the terminal match/matches the target slice.

According to a fourth aspect, an embodiment of the present invention provides a communication method, including: first sending, by an access network device, a slice handover message to a terminal, where the slice handover message includes a target slice identifier, and the slice handover message is used to instruct to hand over the terminal from a source slice to a target slice; and then receiving, by the access network device, a slice handover complete message sent by the terminal, where the slice handover complete message is used to indicate information about a slice to which the terminal is handed over.

According to a fifth aspect, an embodiment of the present invention provides a communication method, including: first sending, by a core network device, a terminal slice handover indication message to an access network device, where the terminal slice handover indication message includes a terminal identifier, and the terminal slice handover indication message is used to instruct the access network device to perform a slice handover for the terminal; and then receiving, by the core network device, a slice handover complete message sent by the access network device, where the slice handover complete message is used to indicate information about a slice to which the terminal is handed over.

According to a sixth aspect, an embodiment of the present invention provides a communication method, including: first receiving, by a terminal, a slice handover message from an access network device, where the slice handover message includes a target slice identifier; then handing over, by the terminal, from a source slice to a target slice based on the target slice identifier; and sending, by the terminal, a slice handover complete message to the access network device.

In this embodiment of the present invention, handover of a user service between different slices is implemented by sending the slice handover message and carrying the target slice identifier in the slice handover messages.

In an example, the slice handover message is a first radio resource control RRC message, and the slice handover complete message is a second RRC message.

In an example, before the sending, by an access network device, a slice handover message to a terminal, the method includes: receiving, by the access network device, a terminal slice handover indication message that is sent by the core network device, where the terminal slice handover indication message includes the terminal identifier and the target slice identifier.

In an example, the slice handover message carries target resource information. Alternatively, the method further includes: broadcasting, by the access network device, the target resource information by using a broadcast message.

In an example, the target resource includes a target spectrum resource.

In an example, the slice handover message is an RRC message.

In an example, the slice handover indication message further includes the target slice identifier and/or the target resource.

In an example, the handing over the terminal from a source slice to a target slice based on the target slice identifier includes: determining, by the terminal, a target slice resource based on the target slice identifier, and handing over from the source slice to the target slice based on the target resource.

In an example, the slice handover message carries information about the target slice resource, and the terminal obtains the target slice resource from the slice handover message. Alternatively, the method further includes: receiving, by the terminal, the information about the target slice resource by using the broadcast message.

According to a seventh aspect, an embodiment of the present invention provides a communication method, including: first sending, by a source access network device, a handover request message to a target access network device, where the handover request message includes source slice information; then receiving, by the source access network device, a handover request response message of the target access network device, where the handover request response message includes target slice information; and finally sending, by the source access network device, a handover message to a terminal, where the handover message includes target resource information, and the handover message is used to instruct to hand over the terminal to the target slice.

According to an eighth aspect, an embodiment of the present invention provides a communication method, including: first sending, by a target access network device, a handover request message from a source access network device, where the handover request message includes source slice information; then determining, by the target access network device, a target resource based on the source slice information and a Quality of Service admission control mechanism of the target access network device; and finally sending, by the target access network device, a handover request response message to the source access network device, where the handover request response message includes target slice information.

In this embodiment of the present invention, a dynamic slice handover on an access network side is implemented by sending the handover request message and carrying the source slice information in the handover request message.

In an example, the handover message is a radio resource control RRC message.

In an example, before the sending, by the source access network device, a handover message to the terminal, the method includes: sending, by the source access network device, the handover request message of the terminal to the target access network device, where the handover request message includes one or more of a center frequency of a source slice of the terminal, spectrum bandwidth of the source slice, or a transmission time interval.

In an example, before the sending, by the source access network device, the handover request message to the target access network device, the method includes: delivering, by the source access network device, measurement control to the terminal; receiving, by the source access network device, a measurement report of the terminal; and determining, based on the measurement report, to hand over the terminal to the target access network device.

In an example, the Quality of Service admission control mechanism of the target access network device is specifically: The target access network device has a slice whose match rate with the source slice reaches a matching threshold, and a quantity of terminals connected to the target access network device is less than a capacity threshold of the target access network device.

According to a ninth aspect, an embodiment of the present invention provides an access network device. The access network device includes a transmitter and a receiver. The transmitter is configured to send a slice resource adjustment message to a terminal, where the slice resource adjustment message includes target resource information, and the slice resource adjustment message is used to instruct the terminal to adjust a resource of a slice currently accessed by the terminal to the target resource. The receiver is configured to receive a slice resource adjustment complete message sent by the terminal, where the slice resource adjustment complete message is used to indicate that the terminal has adjusted the resource of the slice currently accessed by the terminal to the target resource.

In an example, the receiver is further configured to receive an indication message that is from a core network device and that is used to instruct the terminal to adjust the slice resource.

In an example, the target resource includes a target spectrum resource.

In an example, the target spectrum resource includes a target center frequency and/or target spectrum bandwidth.

According to a tenth aspect, an embodiment of the present invention provides a core network device. The core network device includes a transmitter and a receiver. The transmitter is configured to send a slice resource adjustment indication message to an access network device, where the slice resource adjustment indication message includes a terminal identifier and target resource information, and the slice resource adjustment indication message is used to instruct the access network device to adjust a resource of a slice currently accessed by the terminal to the target resource. The receiver is configured to receive a terminal slice resource adjustment complete message sent by the access network device, where the terminal slice resource adjustment complete message is used to indicate that the terminal has adjusted the resource of the slice currently accessed by the terminal to the target resource.

In an example, the slice resource adjustment indication message further includes a target slice identifier.

In an example, the target resource includes a target spectrum resource.

In an example, the target spectrum resource includes a target center frequency and/or target spectrum bandwidth.

According to an eleventh aspect, an embodiment of the present invention provides a terminal. The terminal includes a receiver, a processor, and a transmitter. The receiver is configured to: receive a slice resource adjustment message from an access network device, and obtain target resource information from the slice resource adjustment message. The processor is configured to adjust a resource of a slice currently accessed by the terminal to the target resource. The transmitter is configured to send a slice resource adjustment complete message to the access network device, where the slice resource adjustment complete message is used to indicate that the terminal has adjusted the resource of the slice currently accessed by the terminal to the target resource.

In an example, the processor is further configured to determine whether a software resource and/or a hardware resource of the terminal match/matches the target slice.

According to a twelfth aspect, an embodiment of the present invention provides an access network device. The access network device includes a transmitter and a receiver. The transmitter is configured to send a slice handover message to a terminal, where the slice handover message includes a target slice identifier, and the slice handover message is used to instruct to hand over the terminal from a source slice to a target slice. The receiver is configured to receive a slice handover complete message sent by the terminal, where the slice handover complete message is used to indicate information about a slice to which the terminal is handed over.

In an example, the slice handover message is a first radio resource control RRC message, and the slice handover complete message is a second RRC message.

In an example, the receiver is further configured to receive a terminal slice handover indication message sent by a core network device, where the terminal slice handover indication message includes the terminal identifier and a target slice identifier.

In an example, the slice handover message carries target resource information.

In an example, the target resource includes a target spectrum resource.

In an example, the slice handover message is an RRC message.

According to a thirteenth aspect, an embodiment of the present invention provides a core network device. The core network device includes a transmitter and a receiver. The transmitter is configured to send a terminal slice handover indication message to an access network device, where the terminal slice handover indication message includes a terminal identifier, and the terminal slice handover indication message is used to instruct the access network device to perform a slice handover for the terminal. The receiver is configured to receive a slice handover complete message sent by the access network device, where the slice handover complete message is used to indicate information about a slice to which the terminal is handed over.

In an example, the slice handover indication message further includes a target slice identifier and/or a target resource.

In an example, the target resource includes a target spectrum resource.

In an example, the target spectrum resource includes a target center frequency and/or target spectrum bandwidth.

According to a fourteenth aspect, an embodiment of the present invention provides a terminal. The terminal includes a receiver, a processor, and a transmitter. The receiver is configured to receive a slice handover message from an access network device, where the slice handover message includes a target slice identifier. The processor is configured to hand over the terminal from a source slice to a target slice based on the target slice identifier. The transmitter is configured to send a slice handover complete message to the access network device.

In an example, the slice handover message is a first radio resource control RRC message, and the slice handover complete message is a second RRC message.

In an example, the processor determines a target slice resource based on the target slice identifier, and hands over the terminal from the source slice to the target slice based on the target resource.

In an example, the target resource includes a target spectrum resource.

In an example, the slice handover message carries information about the target slice resource.

In an example, the slice handover message is an RRC message.

According to a fifteenth aspect, an embodiment of the present invention provides an access network device. The access network device includes a transmitter and a receiver. The transmitter is configured to send a handover request message to a target access network device, where the handover request message includes source slice information. The receiver is configured to receive a handover request response message of the target access network device, where the handover request response message includes target slice information. The transmitter is further configured to send a handover message to a terminal, where the handover message includes target resource information, and the handover message is used to instruct to hand over the terminal to the target slice.

In an example, the handover message is a radio resource control RRC message.

In an example, the transmitter is configured to send a handover request message of the terminal to the target access network device, where the handover request message includes one or more of a center frequency of the source slice of the terminal, spectrum bandwidth of the source slice, or a transmission time interval.

In an example, the access network device further includes a processor. The transmitter is configured to deliver measurement control to the terminal; the receiver is configured to receive a measurement report of the terminal; and the processor is configured to determine, based on the measurement report, to hand over the terminal to the target access network device.

According to a sixteenth aspect, an embodiment of the present invention provides an access network device. The access network device includes a receiver, a processor, and a transmitter. The receiver is configured to receive a handover request message from a source access network device, where the handover request message includes source slice information. The processor is configured to determine a target resource based on the source slice information and a Quality of Service admission control mechanism of a target access network device. The transmitter is configured to send a handover request response message to the source access network device, where the handover request response message includes target slice information.

In an example, the Quality of Service admission control mechanism of the target access network device is specifically: The target access network device has a slice whose match rate with the source slice reaches a matching threshold, and a quantity of terminals connected to the target access network device is less than a capacity threshold of the target access network device.

According to a seventeenth aspect, a communications apparatus is provided. The communications apparatus includes a sending unit and a receiving unit. The sending unit is configured to send a slice resource adjustment message to a terminal, where the slice resource adjustment message includes target resource information, and the slice resource adjustment message is used to instruct the terminal to adjust a resource of a slice currently accessed by the terminal to the target resource. The receiving unit is configured to receive a slice resource adjustment complete message sent by the terminal, where the slice resource adjustment complete message is used to indicate that the terminal has adjusted the resource of the slice currently accessed by the terminal to the target resource.

In an example, the receiving unit is further configured to receive an indication message that is from a core network device and that is used to instruct the terminal to adjust the slice resource.

In an example, the target resource includes a target spectrum resource.

In an example, the target spectrum resource includes a target center frequency and/or target spectrum bandwidth.

According to an eighteenth aspect, an embodiment of the present invention provides a communications apparatus. The communications apparatus includes a sending unit and a receiving unit. The sending unit is configured to send a slice resource adjustment indication message to an access network device, where the slice resource adjustment indication message includes a terminal identifier and target resource information, and the slice resource adjustment indication message is used to instruct the access network device to adjust a resource of a slice currently accessed by the terminal to the target resource. The receiving unit is configured to receive a terminal slice resource adjustment complete message sent by the access network device, where the terminal slice resource adjustment complete message is used to indicate that the terminal has adjusted the resource of the slice currently accessed by the terminal to the target resource.

In an example, the slice resource adjustment indication message further includes a target slice identifier.

In an example, the target resource includes a target spectrum resource.

In an example, the target spectrum resource includes a target center frequency and/or target spectrum bandwidth.

According to a nineteenth aspect, an embodiment of the present invention provides a communications apparatus. The communications apparatus includes a receiving unit, an adjustment unit, and a sending unit. The receiving unit is configured to: receive a slice resource adjustment message from an access network device, and obtain target resource information from the slice resource adjustment message. The adjustment unit is configured to adjust a resource of a slice currently accessed by the terminal to the target resource. The sending unit is configured to send a slice resource adjustment complete message to the access network device, where the slice resource adjustment complete message is used to indicate that the terminal has adjusted the resource of the slice currently accessed by the terminal to the target resource.

In an example, the slice resource adjustment apparatus further includes a determining unit, where the determining unit is configured to determine whether a software resource and/or a hardware resource of the terminal match/matches the target slice.

According to a twentieth aspect, an embodiment of the present invention provides a communications apparatus. The communications apparatus includes a sending unit and a receiving unit. The sending unit is configured to send a slice handover message to a terminal, where the slice handover message includes a target slice identifier, and the slice handover message is used to instruct to hand over the terminal from a source slice to a target slice. The receiving unit is configured to receive a slice handover complete message sent by the terminal, where the slice handover complete message is used to indicate information about a slice to which the terminal is handed over.

In an example, the slice handover message is a first radio resource control RRC message, and the slice handover complete message is a second RRC message.

In an example, the receiving unit is configured to receive a terminal slice handover indication message sent by a core network device, where the terminal slice handover indication message includes a terminal identifier and a target slice identifier.

In an example, the slice handover message carries target resource information.

In an example, the target resource includes a target spectrum resource.

In an example, the slice handover message is an RRC message.

According to a twenty-first aspect, an embodiment of the present invention provides a communications apparatus. The communications apparatus includes a sending unit and a receiving unit. The sending unit is configured to send a terminal slice handover indication message to an access network device, where the terminal slice handover indication message includes a terminal identifier, and the terminal slice handover indication message is used to instruct the access network device to perform a slice handover for the terminal. The receiving unit is configured to receive a slice handover complete message sent by the access network device, where the slice handover complete message is used to indicate information about a slice to which the terminal is handed over.

In an example, the slice handover indication message further includes a target slice identifier and/or a target resource.

In an example, the target resource includes a target spectrum resource.

In an example, the target spectrum resource includes a target center frequency and/or target spectrum bandwidth.

According to a twenty-second aspect, an embodiment of the present invention provides a communications apparatus. The communications apparatus includes a receiving unit, a handover unit and a sending unit. The receiving unit is configured to receive a slice handover message from an access network device, where the slice handover message includes a target slice identifier. The handover unit is configured to hand over a terminal from a source slice to a target slice based on the target slice identifier. The sending unit is configured to send a slice handover complete message to the access network device.

In an example, the slice handover message is a first radio resource control RRC message, and the slice handover complete message is a second RRC message.

In an example, the handover unit is further configured to: determine a target slice resource based on the target slice identifier, and hand over a terminal from a source slice to a target slice based on the target resource.

In an example, the target resource includes a target spectrum resource.

In an example, the communications apparatus further includes an obtaining unit, the slice handover message carries information about a target slice resource, and the obtaining unit is configured to obtain the target slice resource from the slice handover message.

In an example, the slice handover message is an RRC message.

According to a twenty-third aspect, an embodiment of the present invention provides a communications apparatus. The communications apparatus includes a sending unit and a receiving unit. The sending unit is configured to send a handover request message to a target access network device, where the handover request message includes source slice information. The receiving unit is configured to receive a handover request response message of the target access network device, where the handover request response message includes target slice information. The sending unit is further configured to send a handover message to a terminal, where the handover message includes target resource information, and the handover message is used to instruct to hand over the terminal to the target slice.

In an example, the handover message is a radio resource control RRC message.

In an example, the sending unit is further configured to send a handover request message of the terminal to the target access network device, where the handover request message includes one or more of a center frequency of the source slice of the terminal, spectrum bandwidth of the source slice, or a transmission time interval.

In an example, the communications apparatus further includes a determining unit, where the sending unit is further configured to deliver measurement control to the terminal; the receiving unit is further configured to receive a measurement report of the terminal; and the determining unit is further configured to determine, based on the measurement report, to hand over the terminal to the target access network device.

According to a twenty-fourth aspect, an embodiment of the present invention provides a communications apparatus. The communications apparatus includes a receiving unit, a determining unit and a sending unit. The receiving unit is configured to receive a handover request message from a source access network device, where the handover request message includes source slice information. The determining unit is configured to determine a target resource based on the source slice information and a Quality of Service admission control mechanism of a target access network device. The sending unit is configured to send a handover request response message to the source access network device, where the handover request response message includes target slice information.

In an example, the Quality of Service admission control mechanism of the target access network device is specifically: The target access network device has a slice whose match rate with the source slice reaches a matching threshold, and a quantity of terminals connected to the target access network device is less than a capacity threshold of the target access network device.

In this embodiment of the present invention, adjustment of a terminal resource is implemented by using the RRC message, and a service of the terminal can be adapted to an adjusted slice, thereby ensuring service continuity and implementing adjustment of a slice resource in a 5G system.

DESCRIPTION OF EMBODIMENTS

Technical solutions of the present invention are further described below in detail with reference to accompanying drawings and embodiments.

A fast-growing mobile communications system needs to meet service requirements in a plurality of scenarios. The International Telecommunication Union (International Telecommunication Union, ITU) defines three service types of a 5G system: an enhanced mobile broadband (Enhanced Mobile Broadband, eMBB) service, an ultra low latency (Ultra low latency, uRLLC) service, and a massive machine type communications (Massive machine communications, mMTC) service. The eMBB provides a user with a high data rate, for example, the high data rate is applied to a high-definition video. The URLLC is a communication service with a high throughput, a low latency, and high availability, such as wireless control applied to an industrial production process, a telemedicine operation. The mMTC is applied to a communications network with a large quantity of devices, for example, a smart water/electricity meter in the Internet of Things.

To meet differentiated performance requirements of different services, slices may be represented in a plurality of forms: including a high-definition video slice, a massive Internet of Things slice, an ultra-low latency service slice, an Internet of Things slice, and the like. A plurality of slices share a computer storage resource and an air interface spectrum resource of a communications infrastructure, and the plurality of slices have respective control plane network function entities and user plane network function entities.

Before the slice handover method in the embodiments of the present invention is described in detail, an architecture of the communications system is first described with reference to FIG. 1.

Figure 1:
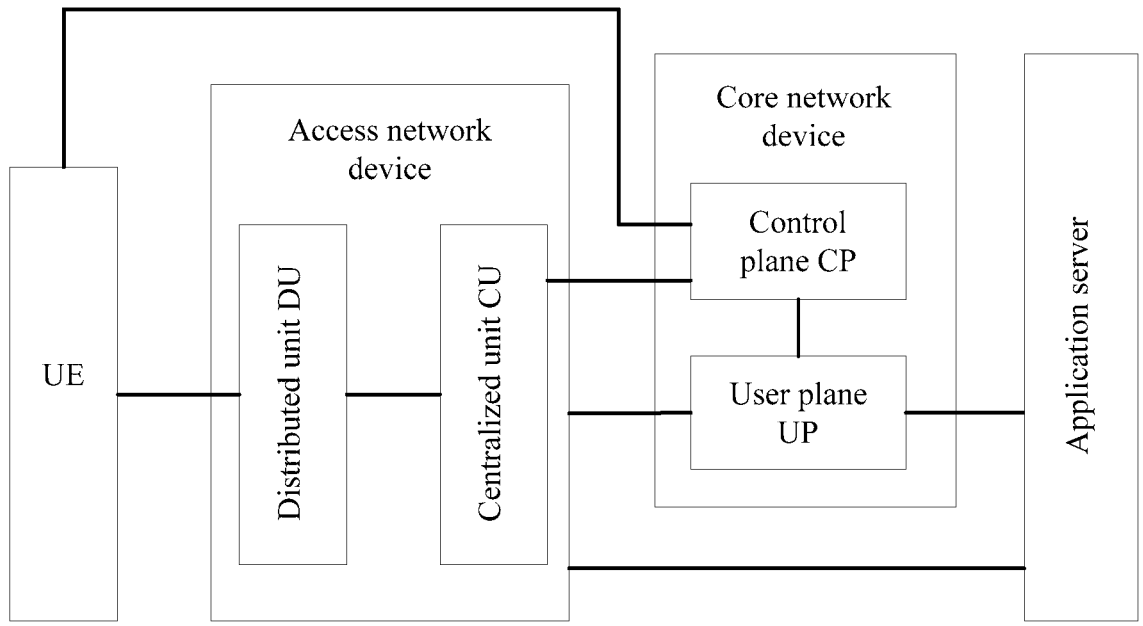
FIG. 1 is a schematic diagram of a network architecture according to an embodiment of the present invention.

FIG. 1 is a schematic diagram of a network architecture according to an embodiment of the present invention.

It may be understood by a person skilled in the art that, FIG. 1 only schematically shows an architecture of a network system including network devices such as a terminal, an access network device, a core network device, and an application server, and a connection relationship between the network devices. Actually, the network system includes more network devices. However, FIG. 1 does not show an entire structure of the network system and a corresponding connection relationship.

In FIG. 1, the access network device is also referred to as a RAN device, and is configured to provide a connection to a wireless network. In an embodiment, the access network device may include a distributed unit (distributed unit, DU) and a centralized unit (centralized unit, CU). The centralized unit CU is configured to control and perform calculation for transmission and convergence of data services. The distributed unit DU is configured to expand a signal coverage area, and enable UE to access a network. The terminal accesses the network by using the distributed unit DU in the access network device.

The core network device is configured to provide functions such as user authentication, security protection, mobility management, session management, and a data path. The core network device may include a gateway, a mobility management entity (Mobility Management Entity, MME) device, a home subscriber server (Home Subscriber Server, HSS), or the like. In a 5G network, the core network devices are centrally deployed, functions of all nodes in the core network are newly divided: Functions that are originally used for user authentication, security protection, mobility management, and session management are centrally deployed on a control plane CP (Control Plane, CP), and functions that are used for the data path and providing service connectivity, and the like are centrally deployed on a user plane (User Plane, UP). In this way, all decisions related to the slice are made by the CP and the CU. This can facilitate slice management. NAS (Network Attached Storage, network attached storage) signaling is transmitted between the UE and the control plane CP.

An application server (Application server) provides a user with a function of accessing the Internet. For example, the application server provides functions such as network gaming, chat, and navigation. In the 5G network architecture, the UE may be directly connected to the application server by using the access network device, or may be connected to the application server by using the access network device first and then by using the core network device, so as to access the Internet. When the UE is directly connected to the application server by using the access network device, functions such as charging, mobility management, and intelligent network trigger are implemented by the access network device. If the UE needs to be connected to the application server by using the core network device, the functions such as charging, mobility management, and intelligent network trigger are implemented by the core network device. In existing 3G and 4G network architectures, to access the Internet, the UE needs to use the core network device, that is, the UE needs to connect to the application server by using the access network device first and then by using the core network device, and the functions such as charging, mobility management, and intelligent network trigger are implemented by the core network device, and the access network device provides only a function of connecting the UE to the network.

The following briefly describes a meaning of a network slice.

In the network, a network does not need to be established for each type of application scenario, but a physical network is divided into a plurality of virtual logical networks, where each virtual network is corresponding to a different application scenario, and the virtual networks are independent of each other.

In a current 4G network, a terminal device is mainly a mobile device such as a mobile phone, and both a radio access network device and a core network device in the 4G network are dedicated devices provided by an equipment vendor. In a future network, a terminal device is not limited to a mobile device such as a mobile phone, and may be a device such as a smart water/electricity meter. Network functions virtualization (Network Functions Virtualization, NFV) is a key factor for implementation of a slice function in a network. The NFV means that software and hardware functions (such as an MME in a core network or a digital unit in the radio access network) of a dedicated device in the network are transferred to a virtual machine (Virtual Machine, VM). After the network functions virtualization NFV is performed on the network, the radio access network and the core network exist in a form of cloud in a software-defined network (Software-Defined Network, SDN), and are respectively responsible for an original mobile terminal access function and a network connection function. After the network uses the network functions virtualization NFV and the software-defined network SDN, the network is sliced into a plurality of virtual sub-networks. For different application scenarios, the network may be sliced into a plurality of virtual sub-networks. For example, the network may be sliced into three slices, including a high-definition video slice, a massive Internet of Things slice, and an ultra-low latency service slice. It should be noted that, this is only an example and is not limited in the present invention.

In conclusion, the slice is a concept of a virtual network resource. Based on different application scenarios, the physical network is sliced into a plurality of virtual networks, and the plurality of virtual networks are logically independent of each other. A slice may be located only in an access network, and in this case, the slice is an air interface resource slice. Alternatively, a slice may be located only in the core network, and in this case, the slice is a core network bearer slice. Alternatively, a slice may be an end-to-end network resource, and in this case, the slice includes both an access network part and a core network part, and the slice is a resource that provides a complete service data path.

Figure 2:
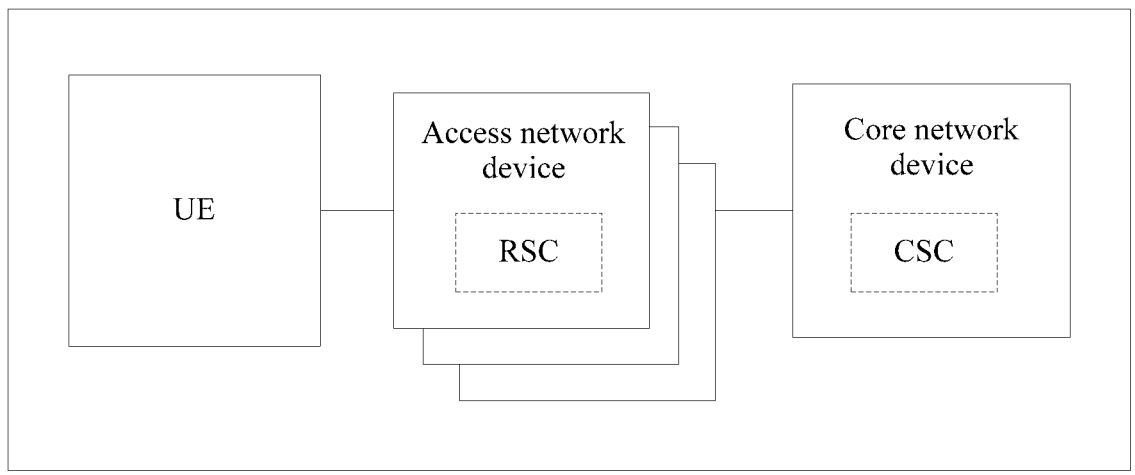
FIG. 2 is a schematic diagram of another network architecture according to an embodiment of the present invention.

FIG. 2 is a schematic diagram of another network architecture according to an embodiment of the present invention. In FIG. 2, a core network device may be a device such as a mobility management entity (Mobility Management Entity, MME), a serving gateway (Serving Gateway, S-GW), or a PDN gateway (Packet Data Network Gateway, P-GW).

The core network device may include a core network slicing controller (Core slicing controller, CSC). The core network controller CSC may determine, based on a local resource usage status of a core network and a policy configured by the core network device, whether to adjust a slice resource of UE. For example, in the core network, total resources used by all terminals are less than 30% of total resources of the core network, and in this case, the core network device increases bandwidth of some slices based on a requirement.

If the core network controller CSC needs to adjust the slice resource of the UE, the CSC sends target resource information of the UE, such as target spectrum bandwidth and/or a target center frequency, to the UE by using an access network device.

Figure 4:
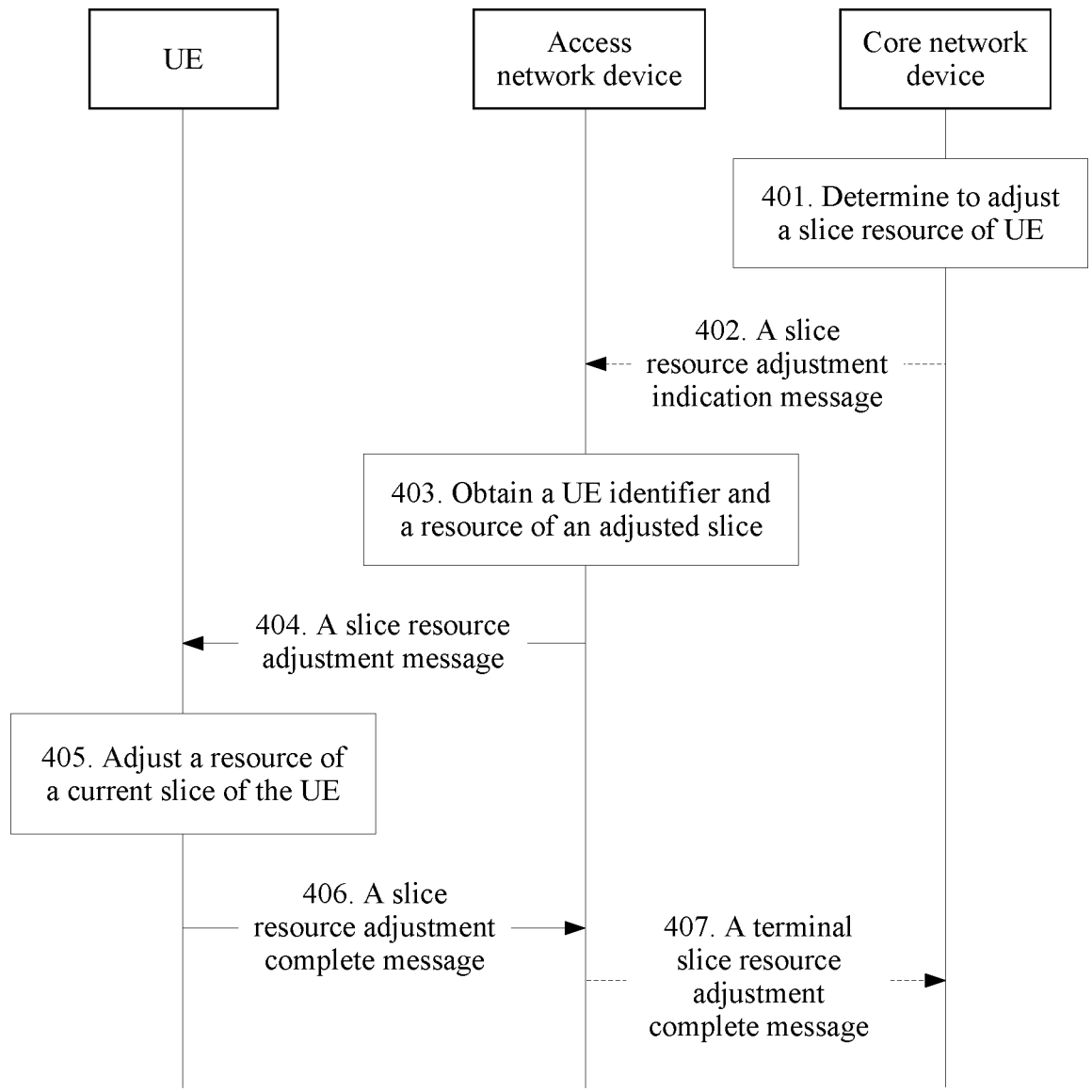
FIG. 4 is a schematic diagram of determining, by a core network device, a handover of a terminal from one slice to another slice according to an embodiment of the present invention.

In addition, if the core network controller CSC needs to hand over the UE from one access network device to another access network device, the core network device further needs to send information about a source slice, such as a source slice identifier (identifier, ID) and a source slice type, to a target access network device (specifically, details are described by using FIG. 4 and related content). For example, the core network device sends the information about the source slice to the target access network device by using the MME or by using an interface between the source access network device and the target access network device.

In addition to determining, by the core network, whether to adjust the slice resource of the UE, an access network may also determine whether to adjust the slice resource of the UE.

The access network device may include an access network slicing controller (RAN slicing controller, RSC). Specifically, the access network slicing controller (RAN slicing controller, RSC) in the access network determines, based on a local resource usage status of the access network and a policy configured by the access network, whether to adjust the slice resource of the UE. If the access network controller RSC determines to adjust the slice resource of the UE, the access network controller RSC sends a slice resource adjustment message to the UE, where the slice resource adjustment message includes the target resource information.

In an example, the target resource includes a target spectrum resource. Further, the target spectrum resource includes the target center frequency and/or the target spectrum bandwidth.

In addition, the terminal may also request the access network device to hand over the terminal from one slice to another slice, that is, the UE sends a handover request to the access network. For example, the terminal requests the access network device to hand over the terminal from a high-definition video slice to a massive Internet of Things slice. The access network slicing controller (RSC) in the access network determines, based on a request of the terminal and a local resource status of the access network, whether to allow a slice handover for the UE. If a slice handover for the UE is allowed, the access network controller RSC allocates spectrum bandwidth of a new slice to the UE.

The following separately describes how to adjust a slice resource of the UE and how to implement handover of a slice-based access network device (that is, in a 5G network, how the UE is handed over from one access network device to another access network device) if the UE is handed over from one slice to another slice.

In the following, a slice before handover is referred to as a source slice, and a slice after the handover is referred to as a target slice.

Figure 3:
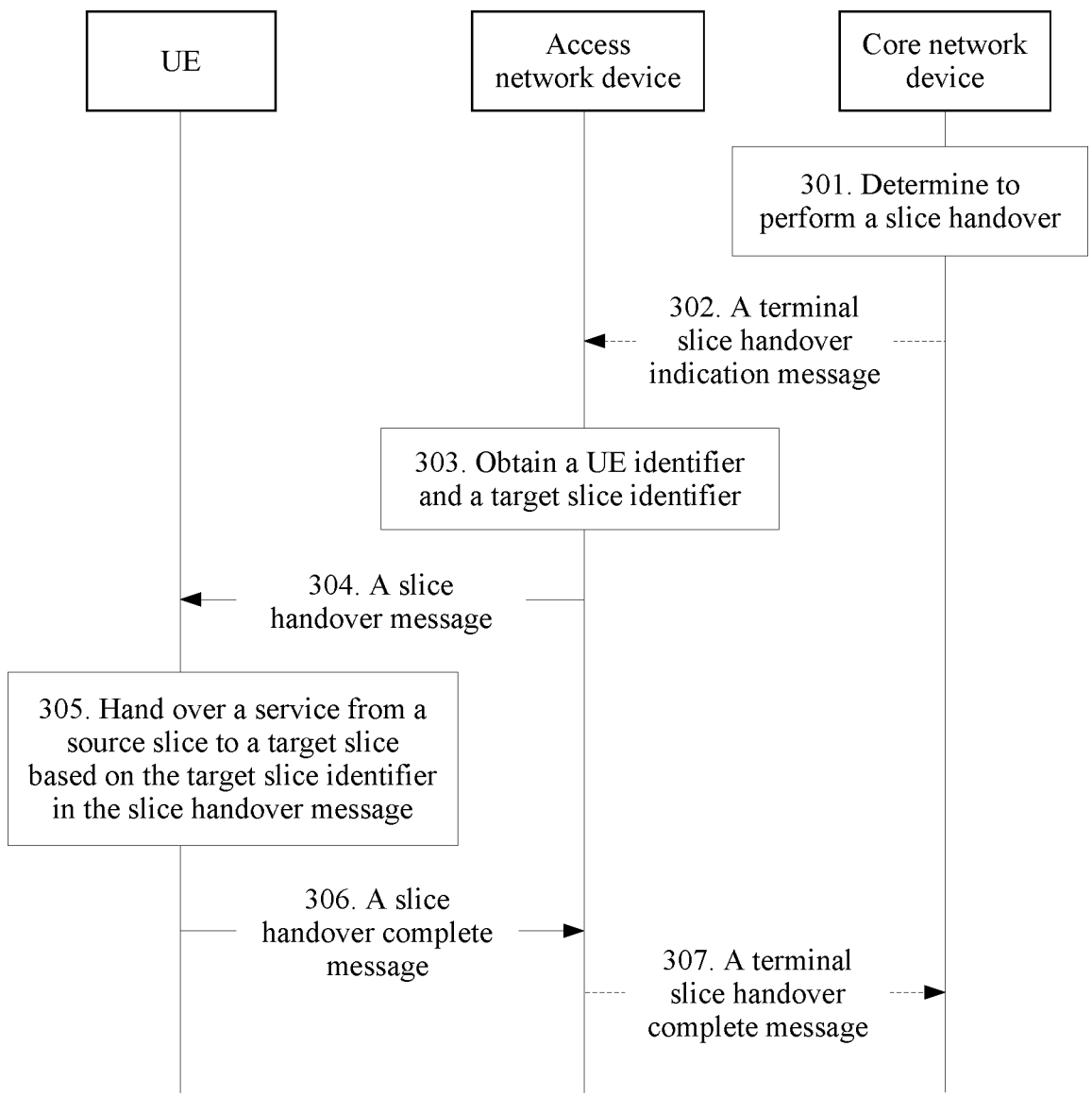
FIG. 3 is a schematic diagram of adjusting, by a core network device, a slice resource of UE according to an embodiment of the present invention.

FIG. 3 is a schematic diagram of determining, by a core network device, a handover of a terminal from one slice to another slice according to an embodiment of the present invention.

Step 301: A core network device, for example, a CSC in a core network, determines, based on a local resource usage status and a policy configured by the core network device, to hand over one UE in a coverage area of the CSC from one slice to another slice.

For example, if the core network device determines that a quantity of terminals carried in the source slice of the UE exceeds a threshold, the core network device determines to hand over the UE from the source slice to the target slice.

Step 302: The core network device sends a terminal slice handover indication message to a radio access network device corresponding to the terminal. The access network device receives the terminal slice handover indication message from the core network device. For example, a control plane CP in the core network device delivers the terminal slice handover indication message to a centralized unit CU of the radio access network device.

In an example, the terminal slice handover indication message carries a UE identifier or a target slice identifier (ID).

Further, the terminal slice handover indication message may include a source slice identifier.

Still further, the terminal slice handover indication message may carry a source slice type and/or a target slice type.

A slice may fall into three types: a massive machine type communication service (massive machine type communication, MTC) slice, an ultra low latency service (Ultra Low Latency, URLLC) slice, and an enhanced mobile broadband service (enhanced mobile broadband, eMBB) slice.

Step 303: The access network device obtains slice information in the terminal slice handover indication message, including a target slice identifier and a UE identifier.

Further, the access network device may obtain the source slice identifier from the terminal slice handover indication message.

Still further, the access network device may obtain the source slice type and/or the target slice type from the terminal slice handover indication message.

Step 304: The access network device sends, based on the UE identifier obtained by the access network device, a slice handover message to UE corresponding to the UE identifier, and the UE receives the slice handover message. The slice handover message carries target slice information and is used to instruct to hand over the UE from the source slice to the target slice.

In an example, the slice handover message may further include a target resource. Further, the target resource includes a target spectrum resource. Still further, the target spectrum resource includes a target center frequency and/or target spectrum bandwidth.

In another example, the access network device broadcasts target resource information by using a broadcast message.

In an example, the target slice message further includes the target slice type.

In an example, the slice handover message may be sent by using a radio resource control (Radio Resource Control, RRC) message.

The RRC message includes an RRC reconfiguration message, an RRC connection establishment request message, and the like. The access network device implements functions such as allocating, reconfiguring, releasing, and setting up a bearer of a radio resource by using the RRC message. When accessing the radio access network, the UE establishes an RRC connection, where the RRC connection is used to allocate radio resources of the control plane and a user plane, and is used to update a cell, update a paging area, implement measurement of the UE, and the like. In this embodiment of the present invention, the RRC message carries the target slice information, including one or more pieces of information about the target slice, such as the target slice ID, the target slice type, and a target slice spectrum resource, so as to implement the handover of the slice of the UE.

If the UE does not access the target slice, in a process of accessing the target slice (that is, step 303 to step 306), the handover of the slice of the UE is implemented by carrying the information about the target slice in the slice handover message, for example, the RRC reconfiguration message. That is, the handover of the slice of the UE is implemented in a process of accessing the target slice by the UE. If the UE has accessed the target slice, the handover of the slice of the UE is implemented in a process of setting up a dedicated bearer between the UE and the access network device or in a process of modifying the dedicated bearer, and the process of setting up the dedicated bearer or the process of modifying the dedicated bearer also needs to be implemented in a process of modifying RRC reconfiguration, that is, be implemented by performing step 303 to step 306.

The UE receives the slice handover message from the access network device, for example, the RRC reconfiguration message, and obtains the target slice information from the RRC reconfiguration message.

It should be noted that, when the UE needs to perform an operation such as handover (such as a base station handover or a slice handover), setting up a bearer, modifying a bearer, or deleting a bearer, the access network device initiates RRC reconfiguration, so as to modify the RRC connection.

In an example, the UE receives the target slice identifier and the target spectrum resource corresponding to the target slice identifier by using a shared control channel.

Specifically, a plurality of slices may share a segment of the spectrum resource; the shared spectrum resource is used as the shared control channel; and the UE obtains, by using the shared control channel, the broadcast message sent by the access network device. Therefore, the UE may receive the target resource by using the shared control channel.

In another example, the access network device stores a correspondence between the target slice identifier and the target resource, that is, a spectrum resource of the target slice. The access network device obtains, through search based on the target slice identifier provided by the core network device, the target resource corresponding to the target slice identifier.

Further, the access network device stores a comparison table between the slice identifier and the target resource, and the access network device obtains the target resource by searching the comparison table based on the target slice identifier from the core network device.

In still another example, the target resource is carried by the core network device by using a slice indication message.

Step 305: The UE performs a slice handover to hand over a service from a source slice to a target slice.

In an example, the UE configures a slice spectrum resource for a service of the UE based on the obtained target slice resource, for example, configures a center frequency and/or spectrum bandwidth of the service for the service of the UE, so as to hand over the service of the UE to the target slice. For example, the service of the UE is handed over from a high-definition video slice to an ultra-low latency service slice.

Step 306: The UE sends a slice handover complete message to the access network device, and the access network device receives the slice handover complete message. For example, the slice handover complete message is an RRC reconfiguration complete message, and the RRC reconfiguration complete message carries information about completion of the handover of the UE.

Step 307: The access network device sends, to the core network device, a message indicating that the slice handover for the UE is completed, where the message indicating that the slice handover for the UE is complete carries the UE identifier and an identifier of a current slice of the UE.

Further, the message indicating that the slice handover for the UE is complete further includes a resource of the current slice. For example, the message indicating that the slice handover for the UE is complete includes a center frequency and/or spectrum bandwidth of the current slice.

It should be noted that, if the UE has not accessed the target slice, the service is handed over in the process of accessing the target slice by the UE. If the UE has accessed the target slice, but the service of the UE has not been handed over to the target slice, the UE directly hands over the service to the target slice. The following separately describes the two cases in detail.

If the UE does not access the target slice, the UE requests the access network device for accessing the target slice; or the access network device or the core network device controls, based on respective local resources or policies, the UE to access the target slice. Herein, an example in which the UE requests a service handover is only used for description.

After the access network device determines to allow the UE to access the target slice, the access network device sends the slice handover message to the UE by using the target slice, where the slice handover message carries information indicating that the UE is handed over from the source slice to the target slice, and the access network device allocates an air interface resource that carries the service to the UE terminal. That the access network device sends the slice handover message to the UE by using the target slice means that the access network device sends the slice handover message to the UE by using the spectrum bandwidth and/or the center frequency corresponding to the target slice.

If the UE has accessed the target slice, a connection has been established, and the UE sends a slice handover request to the access network device by using a default bearer; or the access network device or the core network device controls, based on respective local resources or policies, the UE to access the target slice. Herein, an example in which the UE requests a service handover is only used for description. After the access network device determines to allow a service handover for the UE, the access network device sends the slice handover message to the UE, where the slice handover message carries the target slice ID and/or the spectrum resource of the target slice, and the access network device sets up a service bearer on the target slice of the UE, so that the service of the terminal is transmitted on the target slice.

It should be noted that, the RRC connection may be used to set up, modify, and delete a bearer, where the bearer includes the default bearer and the service bearer. When the access network device and the UE start to establish an RRC connection, only the default bearer exists, and the default bearer is used to transmit basic information, for example, to send a service request. Then, when the UE needs to transmit a large amount of data, such as accessing the Internet or making a call, the access network device sets up the service bearer between the access network device and the UE, where the service bearer is used to transmit service data.

In addition, sometimes a data plane is temporarily disconnected during a slice handover, and consequently, data loss is caused. In this embodiment of the present invention, to ensure data integrity, before the slice handover is completed, service data on the source slice is buffered by using the core network device, and after the slice handover is completed, the service data is sent to the access network device corresponding to the target slice.

It should be noted that, in FIG. 3, the core network device, for example, the CSC in the core network, is used to instruct the access network device to hand over the UE from one slice to another slice. Actually, the access network device, for example, the RSC in the access network, may also hand over the UE from one slice to another slice based on the local resource usage status of the access network and the policy configured by the access network device. The UE may alternatively request the core network to hand over the UE from one slice to another slice.

An example in which the access network device performs a slice handover for the UE is as follows: In the coverage area of the access network device, if total resources used by all terminals are less than 50% of total resources of the access network, the access network device increases bandwidth of some slices according to a requirement. In this case, the UE is handed over from one slice to another slice by performing the foregoing step 303 to step 306.

An example in which the UE requests the core network to perform a slice handover is as follows: The UE sends a request to the core network device to request to hand over the UE from the high-definition video slice to the ultra-low latency service slice, the core network device determines whether to allow a slice handover for the UE, and after the core network device determines to allow the slice handover for the UE, the foregoing step 301 to step 306 are performed.

In this embodiment of the present invention, an example in which the core network device instructs the access network device to perform the slice handover for the UE is only used for description. Actually, the access network device may alternatively initiate the slice handover for the UE. In this case, step 301, step 302, and step 307 do not need to be performed, but only step 303 to step 306 need to be performed; that is, step 301, step 302, and step 307 are optional steps.

FIG. 4 is a schematic diagram of adjusting, by a core network device, a slice resource of UE according to an embodiment of the present invention.

Step 401: A core network device, for example, a control plane (Control Plane, CP) in the core network device, adjusts a slice resource of UE based on a local resource usage status of a core network and a policy configured by the core network device. For example, the core network device adjusts bandwidth of a slice of the UE from 20 MHz to 40 MHz, and adjusts a center frequency from 2.6 GHz to 3.1 GHz.

Step 402: The core network device sends a slice resource adjustment indication message to a radio access network device. The access network device receives the slice resource adjustment indication message from the core network device. For example, the control plane CP in the core network device delivers the slice resource adjustment indication message to a centralized unit CU of the radio access network device. The slice resource adjustment indication message carries a UE identifier and a target resource, that is, a resource of an adjusted slice.

In an example, the target resource includes a target spectrum resource or a target bearer. Further, the target resource is a target center frequency and/or target spectrum bandwidth.

Step 403: The access network device obtains a target resource and a UE identifier from the slice resource adjustment indication message.

Step 404: The access network device sends a slice resource adjustment message to corresponding UE based on the UE identifier, where the message may be sent by using an RRC message, and is used to instruct the UE to adjust the slice resource of the UE. The UE receives the slice resource adjustment message from the access network device.

Alternatively, the access network device may instruct the UE to adjust the slice resource of the UE by using an RRC reconfiguration message.

In an example, the RRC message carries the target spectrum resource, where the target spectrum resource includes the target center frequency and/or the target spectrum bandwidth.

In another example, the access network device broadcasts the UE identifier and the target resource by using a broadcast message, and the UE obtains the target resource by using a shared control channel of each slice.

Step 405: The UE obtains the target resource from the slice resource adjustment message, for example, obtains a target spectrum resource. The target resource includes the target center frequency and/or the target spectrum bandwidth.

Specifically, the UE determines, based on the target resource, whether the adjusted slice matches software and/or hardware of a terminal. If the adjusted slice matches the software and/or the hardware of the terminal, a resource of a current service of the UE is adjusted, that is, a resource is configured for a current slice of the UE, for example, a center frequency and/or the spectrum bandwidth of the current slice of the UE are configured. If the adjusted slice does not match the software and/or the hardware of the terminal, the UE does not adjust the resource of the current service of the UE, that is, terminates resource configuration for the current slice.

Step 406: The UE sends a slice resource adjustment complete message to the access network device, where the slice resource adjustment complete message includes information about that the UE completes adjustment of the slice resource. The slice resource adjustment complete message is, for example, the RRC message. Further, the slice resource adjustment complete message may be an RRC configuration complete message. The access network device receives the slice resource adjustment complete message.

Step 407: The access network device feeds back the slice resource adjustment complete message to the core network device, where the slice resource adjustment complete message is used to indicate that the UE completes the adjustment of the slice resource.

In an example, the slice resource adjustment complete message carries an identifier of the current slice of the UE. Further, the slice resource adjustment complete message includes a spectrum resource or a bearer of the current slice.

It should be noted that, in FIG. 4, the core network device, for example, a CSC in a core network, is used to instruct the access network device to adjust the spectrum resource of the slice of the UE. Actually, the access network device, for example, an RSC in the access network, may alternatively adjust the spectrum resource of the slice of the UE based on the local resource usage status of the access network and the policy configured by the access network device. In this embodiment of the present invention, an example in which the core network device instructs the access network device to adjust the spectrum resource of the slice of the UE is only used for description. Actually, the slice resource of the UE may alternatively be adjusted by the access network device. In this case, step 401, step 402, and step 407 do not need to be performed, but only step 403 to step 406 need to be performed; that is, step 401, step 402, and step 407 are optional steps.

Figure 5:
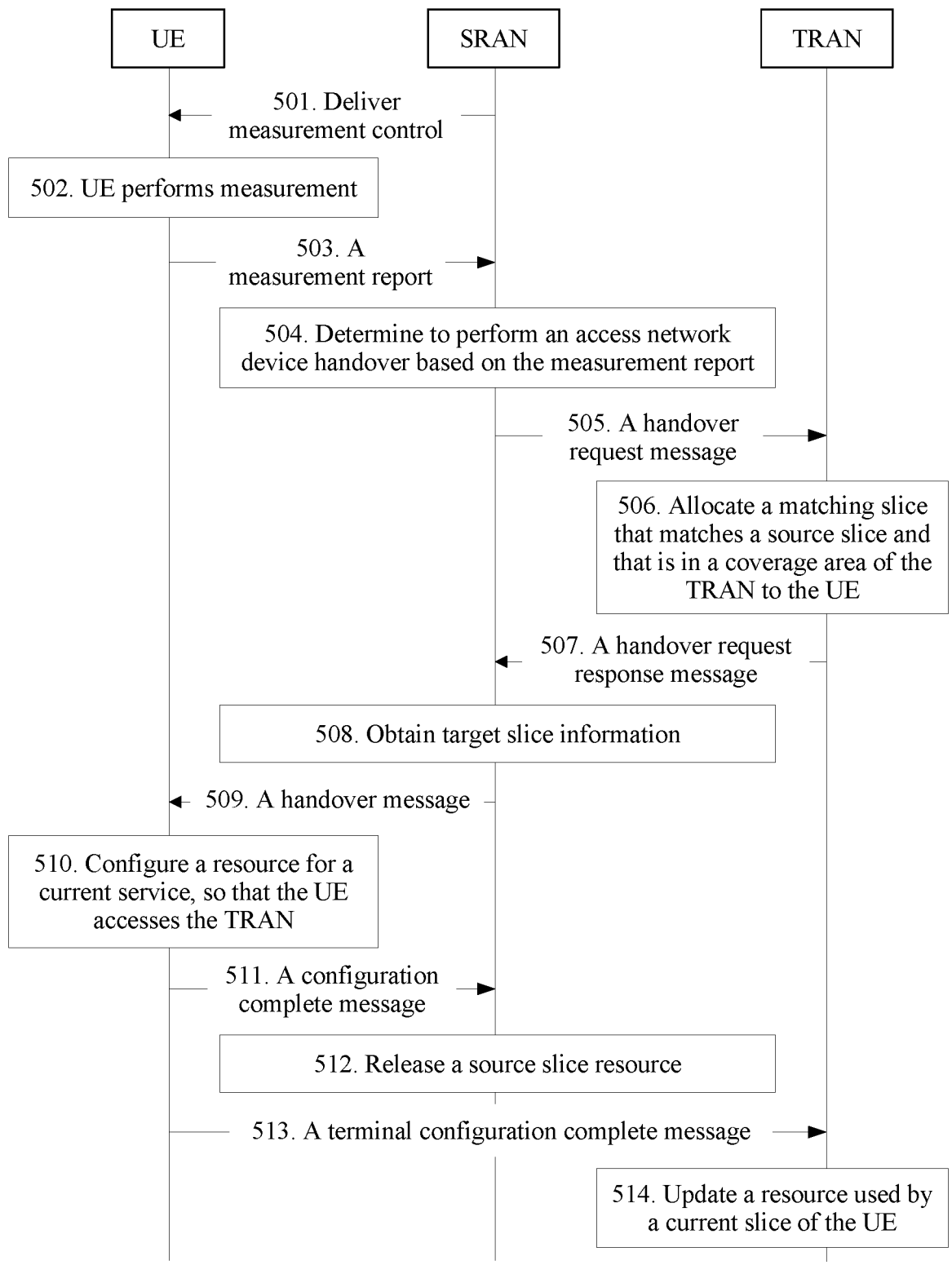
FIG. 5 is a schematic diagram of a method for performing a slice-based base station handover for UE according to an embodiment of the present invention.

FIG. 5 is a schematic diagram of a method for performing a slice-based access network device handover for UE according to an embodiment of the present invention.

Step 501: A source access network (Source RAN, SRAN for short) device delivers measurement control to UE.

For example, the SRAN instructs, by carrying a measurement configuration (measConfig) field in an RRC connection reconfiguration message, the UE to perform measurement. The measurement configuration field includes specific measurement needed and a condition for the measurement.

Step 502: The UE performs measurement, including measuring a cell corresponding to the SRAN, that is, a current serving cell, and optionally, measuring a neighbor cell.

For example, the UE determines, based on an s-Measure field in measurement configuration, whether to measure the neighbor cell.

Step 503: The UE sends a measurement report to the source access network SRAN device.

Specifically, if a measurement condition in the measurement configuration is met, the UE carries the measurement report in a Measurement Report message, and sends the measurement report to the SRAN. The measurement report may include the following content: a cell with a strongest signal, a global cell identity (Cell Global Identity, CGI), a physical cell ID, and a signal measurement result corresponding to the physical cell ID.

Step 504: The SRAN determines, based on the measurement report, whether to perform an access network handover.

Step 505: If the access network handover is needed, the source access network SRAN device sends a handover request message (HO request) to a target access network (Target RAN, TRAN for short) device, where the handover request message carries source slice information and information about the UE.

In an example, the source slice information may include a source slice identifier and/or a source slice resource (a source resource for short). Further, the source resource includes a source spectrum resource. Still further, the source spectrum resource includes source spectrum bandwidth and/or a source center frequency.

In an example, the source slice information may further include a source slice type. The information about the UE may include a UE identifier. The information about the UE may further include software performance and hardware performance of the UE.

A specific target access network device may be determined in a plurality of manners. For example, the UE generates the measurement report by performing uplink measurement, where the measurement report includes at least a quantity of neighbor cells (for example, 6), signal quality of each neighbor cell (which includes field strength, a base station identifier, a broadcast control channel index), a distance between each neighbor cell and the UE, and the like. The UE sends the measurement report to a source base station. The source base station determines the target access network device for the UE according to a preset matching rule. For example, the preset matching rule is that a base station closest to the UE or a base station whose signal strength received by the UE is the highest is used as a target access network device.

Further, the handover request message carries a transmission time interval (Transmission Time Interval, TTI). The reason why the TTI is carried in the slice request message is that, in some cases, for example, in a process of accessing a network by the UE, the TTI may be used as a parameter of the slice resource. That is, the slice resource is not limited to spectrum bandwidth and/or a center frequency of the slice, and may also include the spectrum bandwidth, the center frequency, and the transmission time interval TTI.

Step 506: The target access network TRAN device determines, based on the source slice information of the UE, the information about the UE, and a Quality of Service QoS admission control mechanism of the target access network TRAN device, whether to allow the UE to be handed over to the TRAN; and when QoS admission control of the TRAN is met, the TRAN allocates, to the UE, a slice that matches the source slice of the UE and that is in a coverage area of the TRAN, that is, allocates a target slice.

Step 507: The target access network TRAN device sends a handover request response message (HO Request ACK) to the source access network SRAN device, where the handover request response message carries target slice information.

In an example, the target slice information may include a target slice resource (a target resource for short) and/or a target slice identifier. Further, the target resource includes a target spectrum resource. Still further, the target spectrum resource includes a target center frequency and/or target spectrum bandwidth.

In an example, the target slice information may further include a target slice type.

For example, the target access network TRAN device calculates whether a quantity of UEs in a cell reaches a capacity threshold. If the quantity of UEs in the cell does not reach the capacity threshold, the TRAN (for example, an access network device slicing controller RSC of the TRAN) searches a database of the TRAN to determine whether there is a slice that matches performance of the source slice. If it is detected that the TRAN includes a slice that is the same as or close to the source slice in one or more of the following: Quality of Service QoS, spectrum resource, or transmission time interval TTI, the TRAN uses the detected slice as the target slice of the UE.

Further, the handover request response message may carry the transmission time interval TTI.

Step 508: The source access network SRAN device obtains the target slice information in the handover request response message, where the target slice information includes a target slice resource and/or a target slice identifier.

In an example, the target slice resource includes a spectrum resource or a bearer of the target slice.

Further, the target slice information may include the target slice type.

Further, the handover request response message carries the transmission time interval TTI.

Step 509: The source access network SRAN device sends a handover message to the UE, where the handover message carries the target slice information, and the target slice information includes the target slice resource and/or the target slice identifier.

Further, the target slice information may include the target slice type.

Still further, the RRC message carries the transmission time interval TTI.

In an example, the handover message is an RRC message, for example, an RRC reconfiguration message.

Further, the source access network SRAN device carries the target slice information by using a SIB 1 message (an RRC message).

Step 510: The terminal obtains information about the target slice resource from the handover message, and configures a resource for a current service of the UE, for example, configures a center frequency and/or bandwidth. In an example, the handover message is an RRC message.

In an example, the target slice resource is the spectrum resource of the target slice, for example, a center frequency and/or spectrum bandwidth of the target slice.

Step 511: The UE sends a configuration complete message to the source access network SRAN device. The source access network SRAN device receives the configuration complete message.

Step 512: The source access network SRAN device releases a source slice resource of the UE.

Step 513: The UE sends a terminal configuration complete message to the target access network TRAN device, for example, sends an RRC connection reconfiguration complete message, where the RRC connection reconfiguration complete message carries a current slice resource and/or a current slice identity.

Further, the configuration completion message may carry a current slice type.

Still further, the configuration completion message may carry the transmission time interval TTI.

Step 514: The target access network TRAN device updates a slice resource used by the current service of the UE, and updates a data path of the UE. For example, the TRAN updates a slice identifier and/or a slice resource of the UE.

Further, the target access network TRAN device may update the slice type.

Still further, the target access network TRAN device updates the transmission time interval TTI.

In an example, before the handover is completed, both the UE and the source access network SRAN device store information about the source slice (for example, one or more of the source slice identifier, the source slice spectrum resource, or the source slice type), so that the UE can still reconnect to the source slice of the source access network device when the handover fails. Further, both the UE and the SRAN store the transmission time interval TTI.

Figure 6:
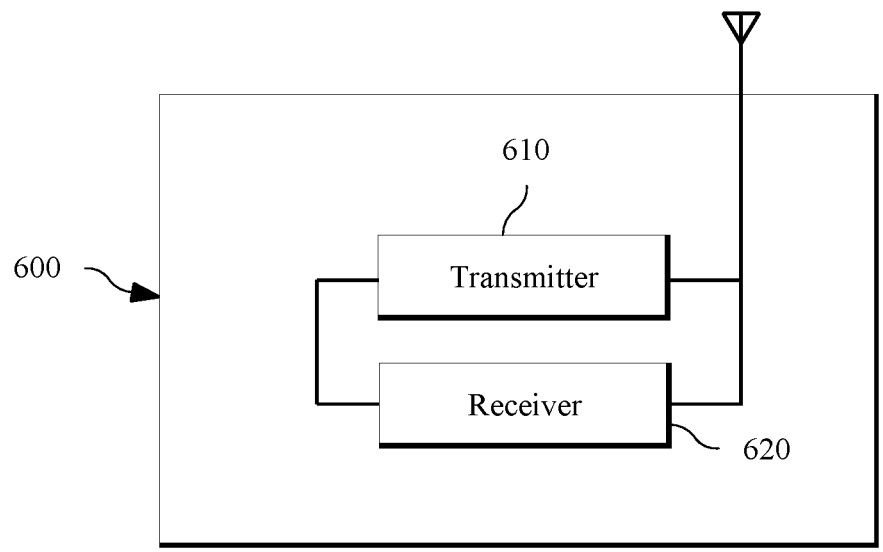
FIG. 6 is a block diagram of an access network device according to an embodiment of the present invention.

FIG. 6 is a schematic diagram of an access network device according to an embodiment of the present invention.

In FIG. 6, the access network device 600 includes a transmitter 610 and a receiver 620.

The transmitter 610 is configured to send a slice resource adjustment message to a terminal, where the slice resource adjustment message includes target resource information, and the slice resource adjustment message is used to instruct the terminal to adjust a resource of a slice currently accessed by the terminal to the target resource.

The receiver 620 is configured to receive a slice resource adjustment complete message sent by the terminal, where the slice resource adjustment complete message is used to indicate that the terminal has adjusted the resource of the slice currently accessed by the terminal to the target resource.

In an example, the receiver 620 is further configured to receive an indication message that is from a core network device and that is used to instruct the terminal to adjust the slice resource.

In an example, the target resource includes a target spectrum resource.

In an example, the target spectrum resource includes a target center frequency and/or target spectrum bandwidth.

Figure 7:
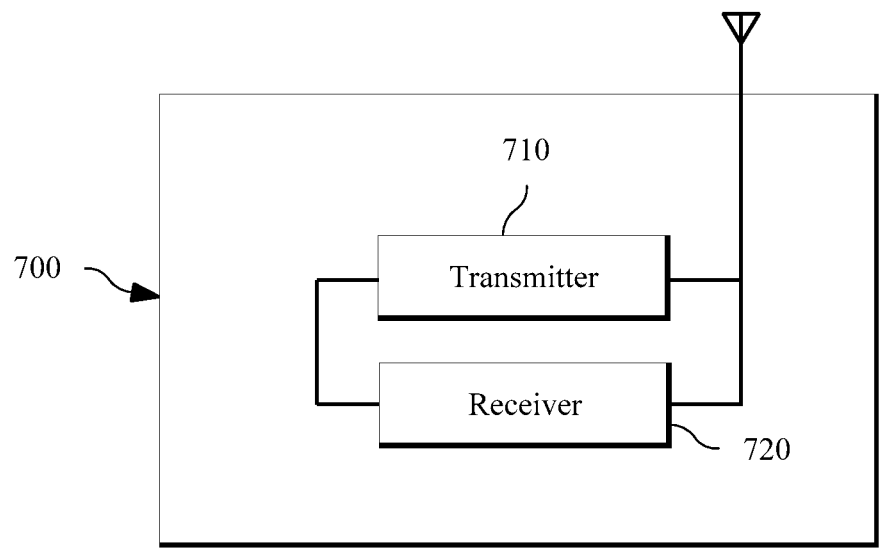
FIG. 7 is a block diagram of a core network device according to an embodiment of the present invention.

FIG. 7 is a schematic diagram of a core network device according to an embodiment of the present invention.

In FIG. 7, the core network device 700 includes a transmitter 710 and a receiver 720.

The transmitter 710 is configured to send a slice resource adjustment indication message to an access network device, where the slice resource adjustment indication message includes a terminal identifier and target resource information, and the slice resource adjustment indication message is used to instruct the access network device to adjust a resource of a slice currently accessed by the terminal to the target resource.

The receiver 720 is configured to receive a terminal slice resource adjustment complete message sent by the access network device, where the terminal slice resource adjustment complete message is used to indicate that the terminal has adjusted the resource of the slice currently accessed by the terminal to the target resource.

In an example, the slice resource adjustment indication message further includes a target slice identifier.

In an example, the target resource includes a target spectrum resource.

In an example, the target spectrum resource includes a target center frequency and/or target spectrum bandwidth.

Figure 8:
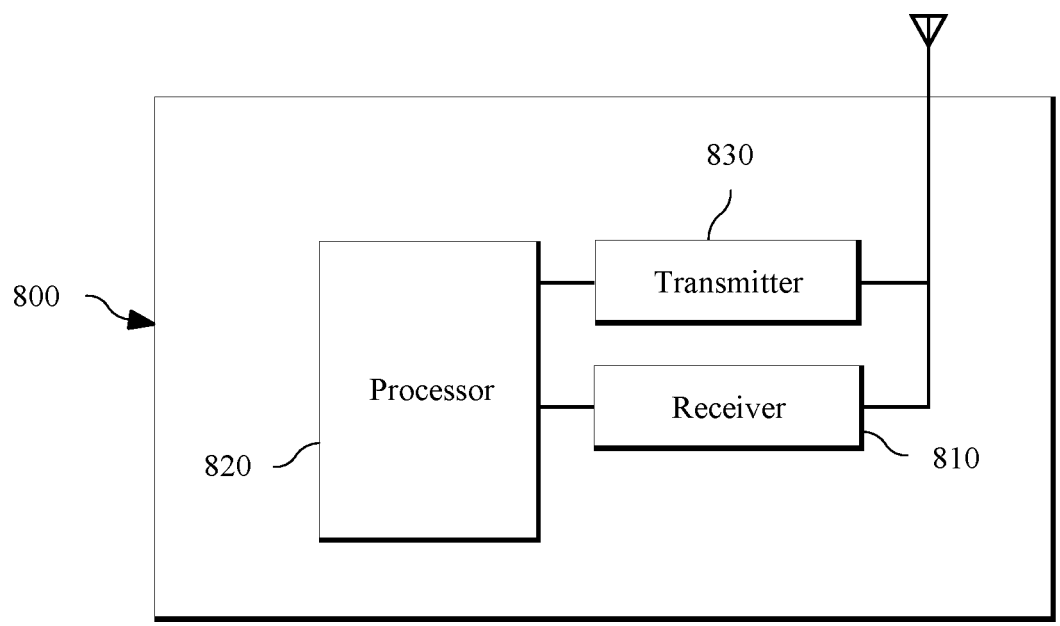
FIG. 8 is a block diagram of a terminal according to an embodiment of the present invention.

FIG. 8 is a schematic diagram of a terminal according to an embodiment of the present invention.

In FIG. 8, the terminal 800 includes a receiver 810, a processor 820, and a transmitter 830.

The receiver 810 is configured to: receive a slice resource adjustment message from an access network device, and obtain target resource information from the slice resource adjustment message.

The processor 820 is configured to adjust a resource of a slice currently accessed by the terminal to the target resource.

The transmitter 830 is configured to send a slice resource adjustment complete message to the access network device, where the slice resource adjustment complete message is used to indicate that the terminal has adjusted the resource of the slice currently accessed by the terminal to the target resource.

In an example, the processor 820 is further configured to determine whether a software resource and/or a hardware resource of the terminal match/matches the target slice.

Figure 9:
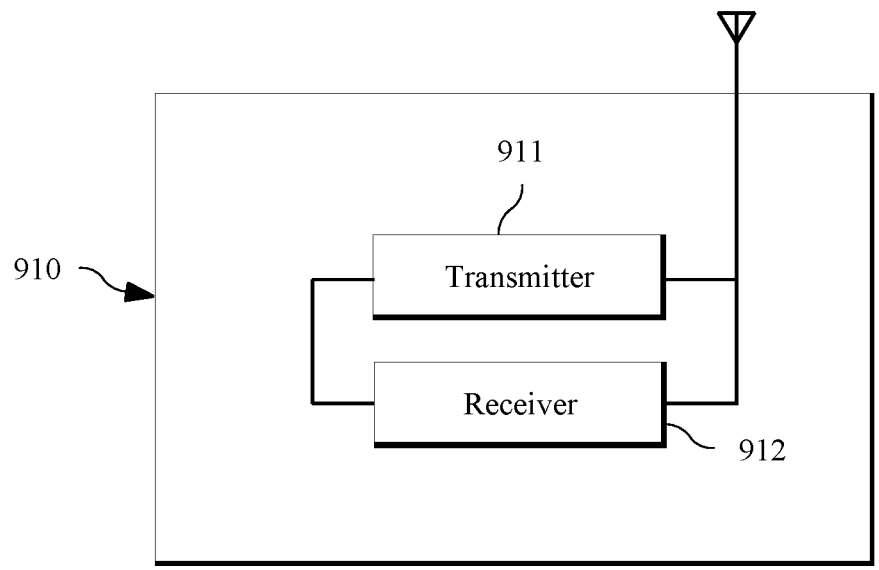
FIG. 9 is a block diagram of an access network device according to another embodiment of the present invention.

FIG. 9 is a schematic diagram of an access network device according to another embodiment of the present invention.

In FIG. 9, the access network device 900 includes a transmitter 910 and a receiver 920.

The transmitter 910 is configured to send a slice handover message to a terminal, where the slice handover message includes a target slice identifier, and the slice handover message is used to instruct to hand over the terminal from a source slice to a target slice.

The receiver 920 is configured to receive a slice handover complete message sent by the terminal, where the slice handover complete message is used to indicate information about a slice to which the terminal is handed over.

In an example, the slice handover message is a first radio resource control RRC message, and the slice handover complete message is a second RRC message.

In an example, the receiver 920 is further configured to receive a terminal slice handover indication message sent by a core network device, where the terminal slice handover indication message includes a terminal identifier and a target slice identifier.

In an example, the slice handover message carries target resource information.

In an example, the target resource includes a target spectrum resource.

In an example, the slice handover message is an RRC message.

Figure 10:
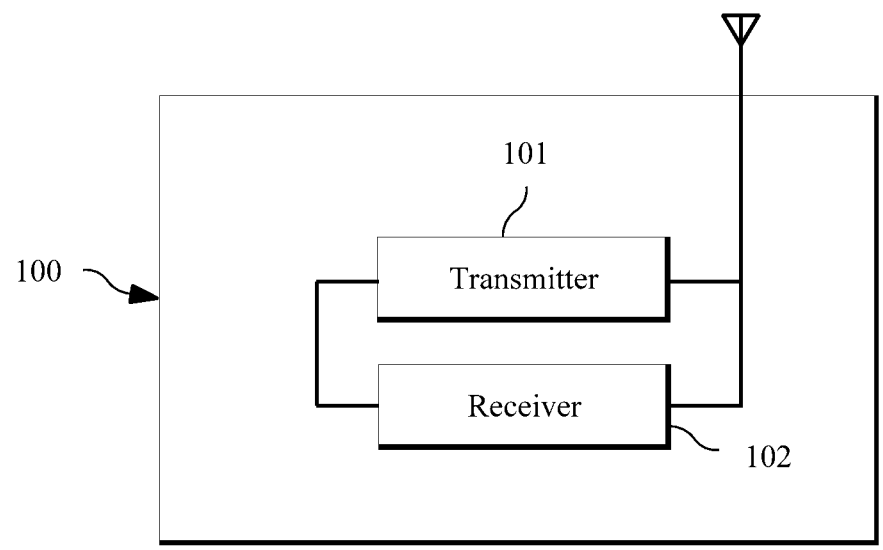
FIG. 10 is a block diagram of a core network device according to another embodiment of the present invention.

FIG. 10 is a schematic diagram of a core network device according to an embodiment of the present invention.

In FIG. 10, the core network device 100 includes a transmitter 101 and a receiver 102.

The transmitter 101 is configured to send a terminal slice handover indication message to an access network device, where the terminal slice handover indication message includes a terminal identifier, and the terminal slice handover indication message is used to instruct the access network device to perform a slice handover for the terminal.

The receiver 102 is configured to receive a slice handover complete message sent by the access network device, where the slice handover complete message is used to indicate information about a slice to which the terminal is handed over.

In an example, the slice handover indication message further includes a target slice identifier and/or a target resource.

In an example, the target resource includes a target spectrum resource.

In an example, the target spectrum resource includes a target center frequency and/or target spectrum bandwidth.

Figure 11:
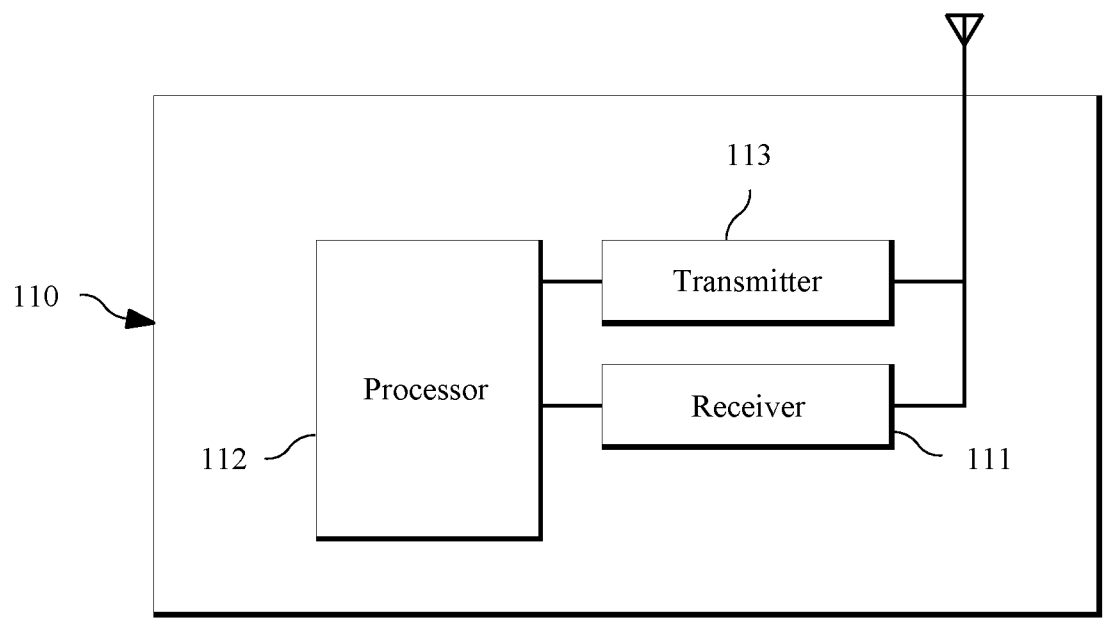
FIG. 11 is a block diagram of a terminal according to another embodiment of the present invention.

FIG. 11 is a schematic diagram of a terminal according to another embodiment of the present invention.

In FIG. 11, the terminal 110 includes a receiver 111, a processor 112, and a transmitter 113.

The receiver 111 is configured to receive a slice handover message from an access network device, where the slice handover message includes a target slice identifier.

The processor 112 is configured to hand over the terminal from a source slice to a target slice based on the target slice identifier.

The transmitter 113 is configured to send a slice handover complete message to the access network device.

In an example, the slice handover message is a first radio resource control RRC message, and the slice handover complete message is a second RRC message.

In an example, the processor 112 determines a target slice resource based on the target slice identifier, and hands over the terminal from the source slice to the target slice based on the target resource.

In an example, the target resource includes a target spectrum resource.

In an example, the slice handover message carries information about the target slice resource.

In an example, the slice handover message is an RRC message.

Figure 12:
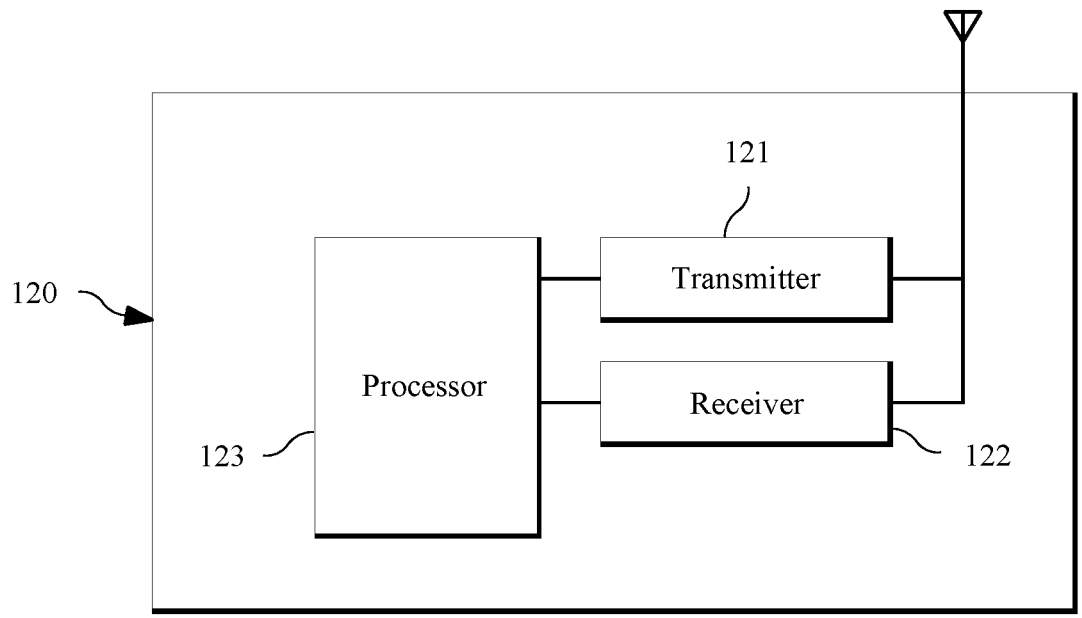
FIG. 12 is a block diagram of an access network device according to still another embodiment of the present invention.

FIG. 12 shows an access network device according to still another embodiment of the present invention.

In FIG. 12, the access network device 120 includes a transmitter 121, a receiver 122, and a processor 123.

The transmitter 121 is configured to send a handover request message to a target access network device, where the handover request message includes source slice information.

The receiver 122 is configured to receive a handover request response message of the target access network device, where the handover request response message includes target slice information.

The transmitter 121 is configured to send a handover message to a terminal, where the handover message includes target resource information, and the handover message is used to instruct to hand over the terminal to the target slice.

In an example, the handover message is a radio resource control RRC message.

In an example, the transmitter 121 is further configured to send a handover request message of the terminal to the target access network device, where the handover request message includes one or more of a center frequency of the source slice of the terminal, spectrum bandwidth of the source slice, or a transmission time interval.

In an example, the transmitter 121 is configured to deliver measurement control to the terminal; the receiver 122 is configured to receive a measurement report of the terminal; and the processor 123 is configured to determine, based on the measurement report, to hand over the terminal to the target access network device.

Figure 13:
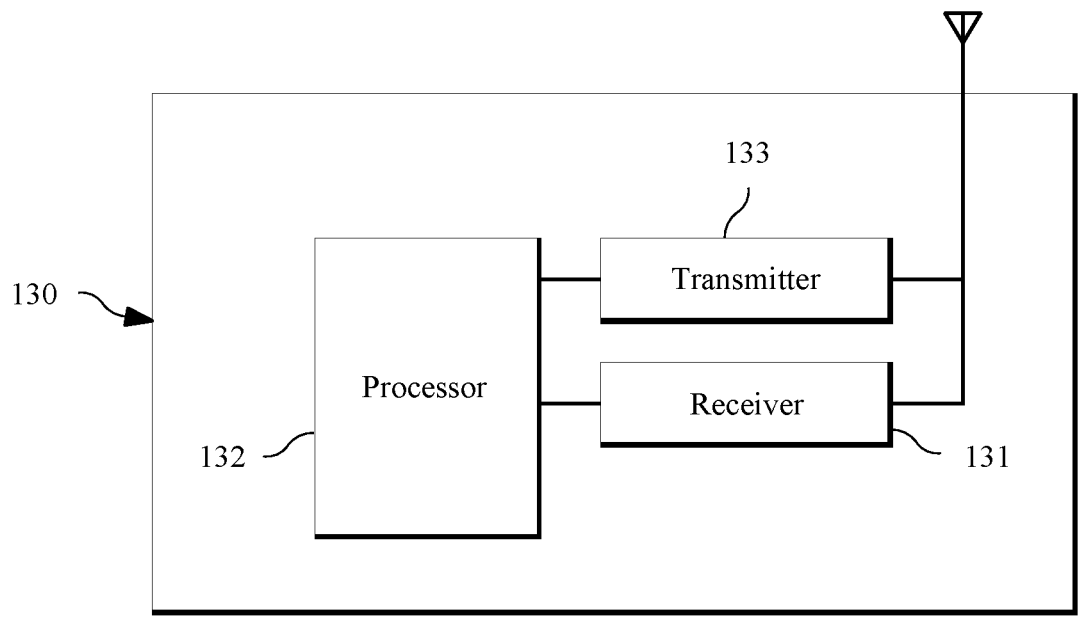
FIG. 13 is a block diagram of an access network device according to another embodiment of the present invention.

FIG. 13 shows an access network device according to another embodiment of the present invention.

In FIG. 13, the access network device 130 includes a receiver 131, a processor 132, and a transmitter 133.

The receiver 131 is configured to receive a handover request message from a source access network device, where the handover request message includes source slice information.

The processor 132 is configured to determine a target resource based on the source slice information and a Quality of Service admission control mechanism of a target access network device.

The transmitter 133 is configured to send a handover request response message to the source access network device, where the handover request response message includes target slice information.

In an example, the Quality of Service admission control mechanism of the target access network device is specifically: The target access network device has a slice whose match rate with the source slice reaches a matching threshold, and a quantity of terminals connected to the target access network device is less than a capacity threshold of the target access network device.

Figure 14:
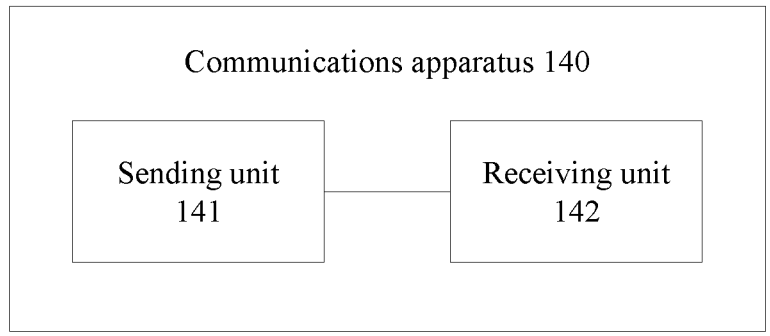
FIG. 14 is a block diagram of a slice resource adjustment apparatus according to an embodiment of the present invention.

FIG. 14 shows a communications apparatus according to an embodiment of the present invention.

In FIG. 14, the communications apparatus 140 includes a sending unit 141 and a receiving unit 142.

The sending unit 141 is configured to send a slice resource adjustment message to a terminal, where the slice resource adjustment message includes target resource information, and the slice resource adjustment message is used to instruct the terminal to adjust a resource of a slice currently accessed by the terminal to the target resource.

The receiving unit 142 is configured to receive a slice resource adjustment complete message sent by the terminal, where the slice resource adjustment complete message is used to indicate that the terminal has adjusted the resource of the slice currently accessed by the terminal to the target resource.

In an example, the receiving unit 142 is further configured to receive an indication message that is from a core network device and that is used to instruct the terminal to adjust the slice resource.

In an example, the target resource includes a target spectrum resource.

In an example, the target spectrum resource includes a target center frequency and/or target spectrum bandwidth.

Figure 15:
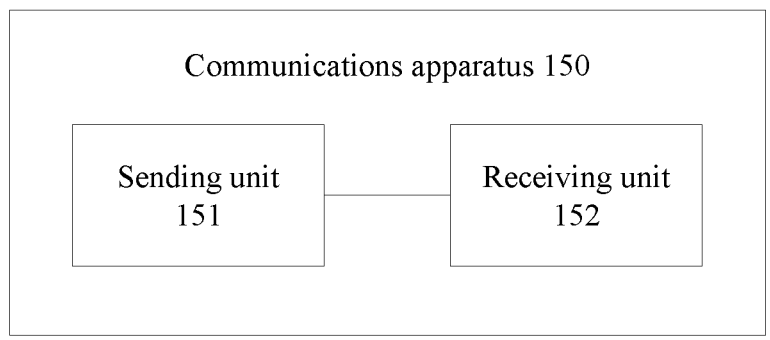
FIG. 15 is a block diagram of a slice resource adjustment apparatus according to another embodiment of the present invention.

FIG. 15 shows a communications apparatus according to another embodiment of the present invention.

In FIG. 15, the communications apparatus 150 includes a sending unit 151 and a receiving unit 152.

The sending unit 151 is configured to send a slice resource adjustment indication message to an access network device, where the slice resource adjustment indication message includes a terminal identifier and target resource information, and the slice resource adjustment indication message is used to instruct the access network device to adjust a resource of a slice currently accessed by the terminal to the target resource.

The receiving unit 152 is configured to receive a terminal slice resource adjustment complete message sent by the access network device, where the terminal slice resource adjustment complete message is used to indicate that the terminal has adjusted the resource of the slice currently accessed by the terminal to the target resource.

In an example, the slice resource adjustment indication message further includes a target slice identifier.

In an example, the target resource includes a target spectrum resource.

In an example, the target spectrum resource includes a target center frequency and/or target spectrum bandwidth.

Figure 16:
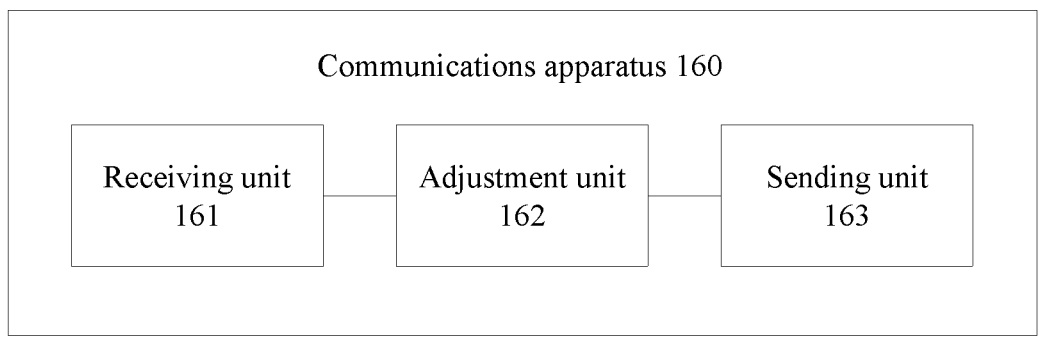
FIG. 16 is a block diagram of a slice resource adjustment apparatus according to still another embodiment of the present invention.

FIG. 16 shows a communications apparatus according to still another embodiment of the present invention.

In FIG. 16, the communications apparatus 160 includes a receiving unit 161, an adjustment unit 162, and a sending unit 163.

The receiving unit 161 is configured to: receive a slice resource adjustment message from an access network device, and obtain target resource information from the slice resource adjustment message.

The adjustment unit 162 is configured to adjust a resource of a slice currently accessed by the terminal to the target resource.

The sending unit 163 is configured to send a slice resource adjustment complete message to the access network device, where the slice resource adjustment complete message is used to indicate that the terminal has adjusted the resource of the slice currently accessed by the terminal to the target resource.

In an example, the slice resource adjustment apparatus further includes a determining unit, where the determining unit is configured to determine whether a software resource and/or a hardware resource of the terminal match/matches the target slice.

Figure 17:
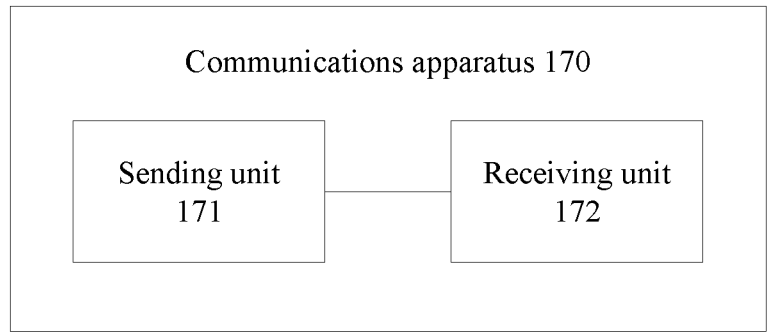
FIG. 17 is a block diagram of a slice handover apparatus according to an embodiment of the present invention.

FIG. 17 shows a communications apparatus according to an embodiment of the present invention.

In FIG. 17, the communications apparatus 170 includes a sending unit 171 and a receiving unit 172.

The sending unit 171 is configured to send a slice handover message to a terminal, where the slice handover message includes a target slice identifier, and the slice handover message is used to instruct to hand over the terminal from a source slice to a target slice.

The receiving unit 172 is configured to receive a slice handover complete message sent by the terminal, where the slice handover complete message is used to indicate information about a slice to which the terminal is handed over.

In an example, the slice handover message is a first radio resource control RRC message, and the slice handover complete message is a second RRC message.

In an example, the receiving unit 172 is configured to receive a terminal slice handover indication message sent by a core network device, where the terminal slice handover indication message includes a terminal identifier and a target slice identifier.

In an example, the slice handover message carries target resource information.

In an example, the target resource includes a target spectrum resource.

In an example, the slice handover message is an RRC message.

Figure 18:
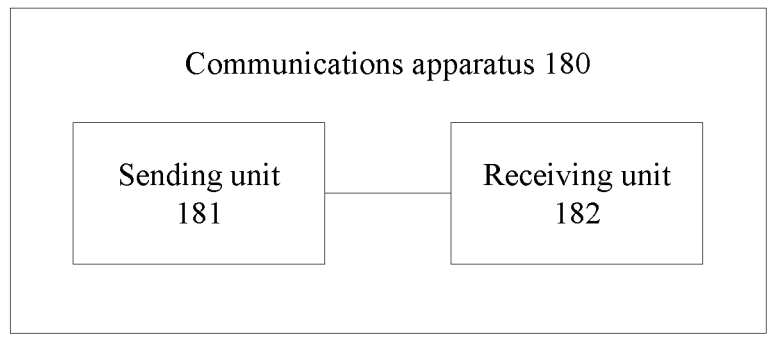
FIG. 18 is a block diagram of a slice handover apparatus according to another embodiment of the present invention.

FIG. 18 shows a communications apparatus according to another embodiment of the present invention.

In FIG. 18, the communications apparatus 180 includes a sending unit 181 and a receiving unit 182.

The sending unit 181 is configured to send a terminal slice handover indication message to an access network device, where the terminal slice handover indication message includes a terminal identifier, and the terminal slice handover indication message is used to instruct the access network device to perform a slice handover for the terminal.

The receiving unit 182 is configured to receive a slice handover complete message sent by the access network device, where the slice handover complete message is used to indicate information about a slice to which the terminal is handed over.

In an example, the slice handover indication message further includes a target slice identifier and/or a target resource.

In an example, the target resource includes a target spectrum resource.

In an example, the target spectrum resource includes a target center frequency and/or target spectrum bandwidth.

Figure 19:
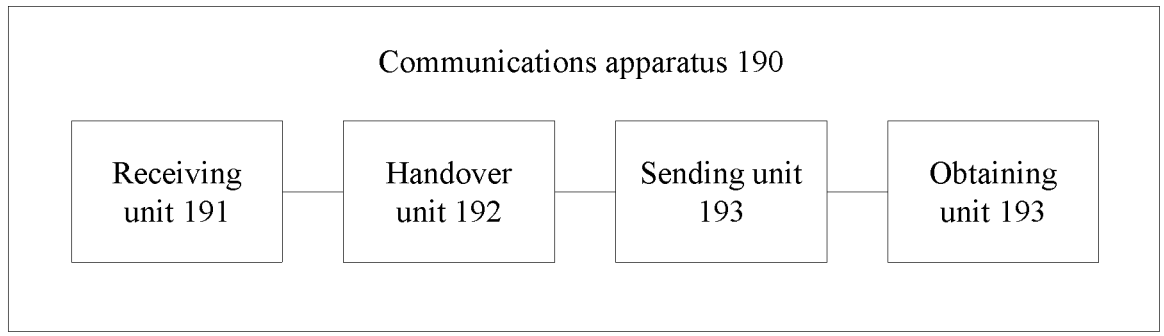
FIG. 19 is a block diagram of a slice handover apparatus according to still another embodiment of the present invention.

FIG. 19 shows a communications apparatus according to still another embodiment of the present invention.

In FIG. 19, the communications apparatus 190 includes a receiving unit 191, a handover unit 192, a sending unit 193, and an obtaining unit 194.

The receiving unit 191 is configured to receive a slice handover message from an access network device, where the slice handover message includes a target slice identifier.

The handover unit 192 is configured to hand over a terminal from a source slice to a target slice based on the target slice identifier.

The sending unit 193 is configured to send a slice handover complete message to the access network device.

In an example, the slice handover message is a first radio resource control RRC message, and the slice handover complete message is a second RRC message.

In an example, the handover unit 192 is further configured to: determine a target slice resource based on the target slice identifier, and hand over the terminal from the source slice to the target slice based on the target resource.

In an example, the target resource includes a target spectrum resource.

In an example, the slice handover message carries information about the target slice resource, and the obtaining unit 194 is configured to obtain the target slice resource from the slice handover message.

In an example, the slice handover message is an RRC message.

Figure 20:
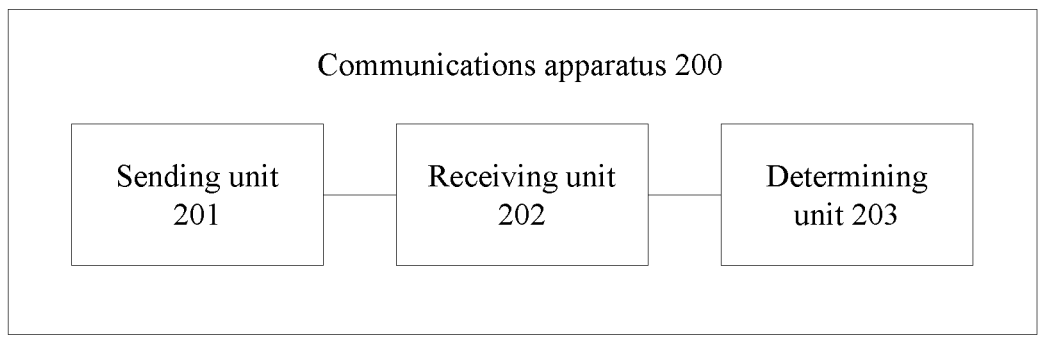
FIG. 20 is a block diagram of an apparatus for performing an access network device handover according to an embodiment of the present invention.

FIG. 20 shows a communications apparatus according to an embodiment of the present invention.

In FIG. 20, the communications apparatus 200 includes a sending unit 201, a receiving unit 202, and a determining unit 203.

The sending unit 201 is configured to send a handover request message to a target access network device, where the handover request message includes source slice information.

The receiving unit 202 is configured to receive a handover request response message of the target access network device, where the handover request response message includes target slice information.

The sending unit 201 is further configured to send a handover message to a terminal, where the handover message includes target resource information, and the handover message is used to instruct to hand over the terminal to the target slice.

In an example, the handover message is a radio resource control RRC message.

In an example, the sending unit 201 is further configured to send a handover request message of the terminal to the target access network device, where the handover request message includes one or more of a center frequency of the source slice of the terminal, spectrum bandwidth of the source slice, or a transmission time interval.

In an example, the sending unit 201 is further configured to deliver measurement control to the terminal; the receiving unit 202 is further configured to receive a measurement report of the terminal; and the determining unit 203 is further configured to determine, based on the measurement report, to hand over the terminal to the target access network device.

Figure 21:
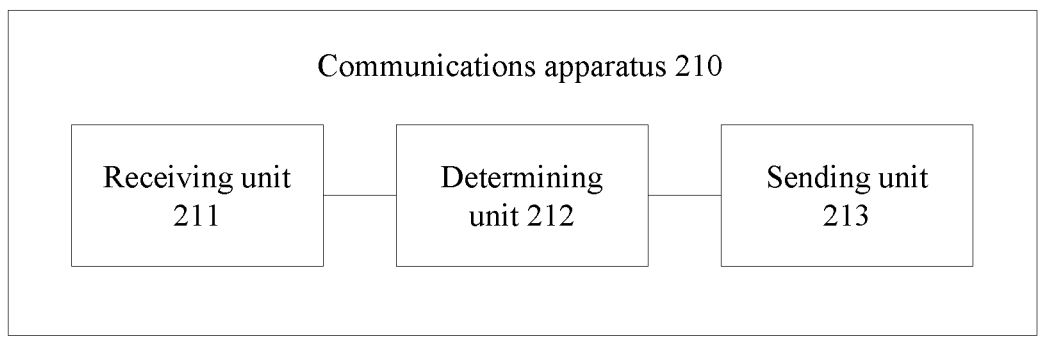
FIG. 21 is a block diagram of an apparatus for performing an access network device handover according to another embodiment of the present invention.

FIG. 21 shows a communications apparatus according to another embodiment of the present invention.

In FIG. 21, the communications apparatus 210 includes a receiving unit 211, a determining unit 212, and a sending unit 213.

The receiving unit 211 is configured to receive a handover request message from a source access network device, where the handover request message includes source slice information.

The determining unit 212 is configured to determine a target resource based on the source slice information and a Quality of Service admission control mechanism of a target access network device.

The sending unit 213 is configured to send a handover request response message to the source access network device, where the handover request response message includes target slice information.

In an example, the Quality of Service admission control mechanism of the target access network device is specifically: The target access network device has a slice whose match rate with the source slice reaches a matching threshold, and a quantity of terminals connected to the target access network device is less than a capacity threshold of the target access network device.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A communication method, wherein the method comprises:
   determining, for a terminal and by an access network device, whether adjusting a resource of a slice accessed by the terminal is required based on a network spectrum resource usage status;
   sending, by the access network device in response to a determination that adjusting the resource of the slice accessed by the terminal is required based on the network spectrum resource usage status, a slice resource adjustment message to the terminal, wherein the slice resource adjustment message comprises target resource information, and wherein the slice resource adjustment message is used to instruct the terminal to adjust the resource of the slice currently accessed by the terminal to a target resource; and
   receiving, by the access network device, a slice resource adjustment complete message sent by the terminal, wherein the slice resource adjustment complete message is used to indicate that the terminal has adjusted the resource of the slice currently accessed by the terminal to the target resource.

2. The method according to claim 1, wherein before the sending, by the access network device, the slice resource adjustment message to the terminal, the method comprises:
   receiving, by the access network device, an indication message that is from a core network device and that is used to instruct the terminal to adjust a slice resource.

3. The method according to claim 1, wherein the target resource comprises a target spectrum resource.

4. The method according to claim 3, wherein the target spectrum resource comprises a target center frequency and/or target spectrum bandwidth.

5. The method according to claim 1, wherein determining whether to adjust the resource of the slice accessed by the terminal based on the network spectrum resource usage status is required is determined based on a total resources used by all terminals in coverage of the access network device that is less than a threshold of the total resources of the access network device.

6. A communication method, wherein the method comprises:
   determining, for a terminal and by a core network device, whether adjusting a resource of a slice accessed by the terminal is required based on a network spectrum resource usage status;
   sending, by the core network device in response to a determination that adjusting the resource of the slice accessed by the terminal is required based on the network spectrum resource usage status, a slice resource adjustment indication message to an access network device, wherein the slice resource adjustment indication message comprises a terminal identifier and target resource information, and wherein the slice resource adjustment indication message is used to instruct the access network device to adjust the resource of the slice currently accessed by the terminal associated with the terminal identifier to a target resource; and
   receiving, by the core network device, a terminal slice resource adjustment complete message sent by the access network device, wherein the terminal slice resource adjustment complete message is used to indicate that the terminal associated with the terminal identifier has adjusted the resource of the slice currently accessed by the terminal associated with the terminal identifier to the target resource.

7. The method according to claim 6, wherein the slice resource adjustment indication message further comprises a target slice identifier.

8. The method according to claim 6, wherein the target resource comprises a target spectrum resource.

9. The method according to claim 8, wherein the target spectrum resource comprises a target center frequency and/or target spectrum bandwidth.

10. The method according to claim 6, wherein determining whether to adjust adjusting the resource of the slice accessed by the terminal based on the network spectrum resource usage status is required is determined based on a total resources used by all terminals in coverage of the core network device that is less than a threshold of the total resources of the core network device.

11. A communication method, wherein the method comprises:
    receiving, by a terminal, a slice resource adjustment message from an access network device, wherein the slice resource adjustment message is trigged based on a network determination, wherein the network determination indicates that adjusting a resource of a slice accessed by the terminal is required based on a network spectrum resource usage status;
    in response to receiving the slice resource adjustment message:
      obtaining, by the terminal, target resource information from the slice resource adjustment message;
      adjusting, by the terminal, the resource of the slice currently accessed by the terminal to a target resource; and
      sending, by the terminal, a slice resource adjustment complete message to the access network device, wherein the slice resource adjustment complete message is used to indicate that the terminal has adjusted the resource of the slice currently accessed by the terminal to the target resource.

12. An access network device, comprising:
    an access network controller, the access network controller configured to determine, for a terminal by the access network device, whether adjusting a resource of a slice accessed by the terminal is required based on a network spectrum resource usage status;
    a transmitter, the transmitter configured to, in response to a determination that adjusting the resource of the slice accessed by the terminal is required based on the network spectrum resource usage status, send a slice resource adjustment message to the terminal, wherein the slice resource adjustment message comprises target resource information, and wherein the slice resource adjustment message is used to instruct the terminal to adjust the of the slice currently accessed by the terminal to a target resource; and
    a receiver, the receiver configured to receive a slice resource adjustment complete message sent by the terminal, wherein the slice resource adjustment complete message is used to indicate that the terminal has adjusted the resource of the slice currently accessed by the terminal to the target resource.

13. The access network device according to claim 12, wherein the receiver is further configured to receive an indication message that is from a core network device and that is used to instruct the terminal to adjust a slice resource.

14. The access network device according to claim 12, wherein the target resource comprises a target spectrum resource.

15. The access network device according to claim 14, wherein the target spectrum resource comprises a target center frequency and/or target spectrum bandwidth.

16. A core network device, comprising:
a network slicing controller, the network slicing controller configured to determine, for a terminal by the core network device, whether adjusting a resource of a slice accessed by the terminal is required based on a network spectrum resource usage status;
a transmitter, the transmitter configured to, in response to a determination that adjusting the resource of the slice accessed by the terminal is required based on the network spectrum resource usage status, send a slice resource adjustment indication message to an access network device, wherein the slice resource adjustment indication message comprises a terminal identifier and target resource information, and wherein the slice resource adjustment indication message is used to instruct the access network device to adjust the resource of the slice currently accessed by the terminal to a target resource; and
a receiver, the receiver configured to receive a terminal slice resource adjustment complete message sent by the access network device, wherein the terminal slice resource adjustment complete message is used to indicate that the terminal has adjusted the resource of the slice currently accessed by the terminal to the target resource.

17. The core network device according to claim 16, wherein the slice resource adjustment indication message further comprises a target slice identifier.

18. The core network device according to claim 16, wherein the target resource comprises a target spectrum resource.

19. The core network device according to claim 18, wherein the target spectrum resource comprises a target center frequency and/or target spectrum bandwidth.

20. A terminal, comprising:
a receiver, the receiver configured to:
receive a slice resource adjustment message from an access network device, wherein the slice resource adjustment message is trigged based on a network determination, wherein the network determination indicates that adjusting a resource of a slice accessed by the terminal is required based on a network spectrum resource usage status; and
obtain target resource information from the slice resource adjustment message;
at least one processor, the at least one processor configured to adjust the resource of the slice currently accessed by the terminal to a target resource; and
a transmitter, the transmitter configured to send a slice resource adjustment complete message to the access network device, wherein the slice resource adjustment complete message is used to indicate that the terminal has adjusted the resource of the slice currently accessed by the terminal to the target resource.

* * * * *

UNITED STATES PATENT AND TRADEMARK OFFICE
CERTIFICATE OF CORRECTION

| | | |
|---|---|---|
| PATENT NO. | : 10,893,508 B2 | Page 1 of 1 |
| APPLICATION NO. | : 16/401999 | |
| DATED | : January 12, 2021 | |
| INVENTOR(S) | : Yuhua Chen, Qiyang Zhao and Rui Ni | |

It is certified that error appears in the above-identified patent and that said Letters Patent is hereby corrected as shown below:

In the Claims

In Column 30, Line 56, in Claim 12, delete "the of the" and insert -- the resource of the --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*